United States Patent [19]
Said et al.

[11] Patent Number: 5,262,960
[45] Date of Patent: Nov. 16, 1993

[54] EXPERT ELECTRICAL POWER SIMULATOR

[75] Inventors: Waleed Said; Robert Glass, both of Rockford, Ill.

[73] Assignee: Sundstrand Corporation, Rockford, Ill.

[21] Appl. No.: 680,694

[22] Filed: Apr. 4, 1991

[51] Int. Cl.$^5$ .............................. G06F 15/56
[52] U.S. Cl. .................. 364/495; 364/578; 364/481
[58] Field of Search ............... 364/495, 492, 493, 483, 364/578, 148, 149, 150, 481; 322/20, 47

[56] References Cited

U.S. PATENT DOCUMENTS

| | | | |
|---|---|---|---|
| 3,826,906 | 7/1974 | Carlson et al. | 364/495 |
| 3,833,927 | 9/1974 | Carlson et al. | 364/495 X |
| 3,863,270 | 1/1975 | Haley et al. | 364/495 X |
| 3,914,794 | 10/1975 | Czerniejewski | 364/578 |
| 4,042,813 | 8/1977 | Johnson | 364/578 X |
| 4,403,292 | 9/1983 | Ejzak et al. | 364/492 |
| 4,488,198 | 12/1984 | Christen et al. | 322/20 X |
| 4,684,873 | 8/1987 | Glennon | 322/47 |
| 4,916,628 | 4/1990 | Kugler | 364/492 |
| 4,977,529 | 12/1990 | Gregg et al. | 364/578 |
| 5,053,635 | 10/1991 | West | 322/47 X |

Primary Examiner—Kevin J. Teska
Attorney, Agent, or Firm—Antonelli, Terry, Stout & Kraus

[57] ABSTRACT

A simulator (100) of an electrical power generating system in accordance with the invention includes a programmed electrical power system simulator (104) specifying at least one simulated electrical power generating element (200) for generating electrical power and at least one simulated contactor (202, 206, 210, 212 and 216) for connecting the at least one simulated electrical power generating element to at least one simulated load bus (208), a state of the simulated elements of the simulated electrical power generating system during simulated generation of electrical power and a simulated state of elements of the electrical power generating system in response to a simulated fault condition; an input (102) for inputting data to the programmed simulator relating to the simulated operation of the electrical power generating system; and an output (106) for outputting data from the programmed simulator including a display for displaying data outputted from the programmed simulator relating to simulated operation of the electrical power generating system.

34 Claims, 36 Drawing Sheets

FIG. 2

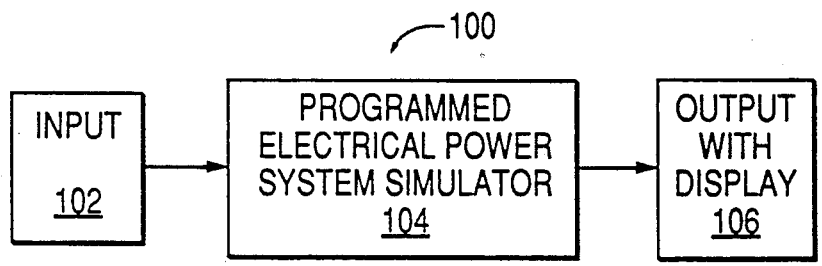

INPUT 102 → PROGRAMMED ELECTRICAL POWER SYSTEM SIMULATOR 104 → OUTPUT WITH DISPLAY 106

| OPERATOR | REMARKS |
|---|---|
| > | GREATER THAN |
| < | LESS THAN |
| = | EQUAL TO |

FIG. 4

| VALUE | OPERATOR | INDICATES |
|---|---|---|
| TRUE | = | A NONINVERTED SIGNAL-NAME |
| FALSE | = | AN INVERTED SIGNAL-NAME |
| OPEN | = | A CONTACTOR IN THE OPEN POSITION |
| CLOSED | = | A CONTACTOR IN THE CLOSED POSITION |
| SET | = | A LATCH WITH SET ASSERTED |
| RESET | = | A LATCH WITH RESET ASSERTED |
| ON | = | A SWITCH IN THE ON POSITION |
| OFF | = | A SWITCH IN THE OFF POSITION |
| CORRECT | = | ??????????????? |
| INCORRECT | = | ??????????????? |
| NUMERICAL | >,<,= | A REAL POSITIVE NUMBER (E.G. 0.048, 400.0, 1.488) |
| TIE | = | ACXTR IN THE TIE POSITION |

```
KEE Typescript Window

The conclusion STATUS-COMMAND of GCB-1 = CLOSED occurred because
GR-COMMAND-LATCH of GCU-1 = SET fired rule GR-ACTUATION-COMMAND
at time 30.188

The conclusion GR-COMMAND-LATCH of GCU-1 = SET occurred because
GR-CLOSE-COMMAND-TIME-DELAY of GCU-1 = TRUE fired rule GR-COMMAND-LATCH-SET
at time 30.188

The conclusion GR-CLOSE-COMMAND-TIME-DELAY of GCU-1 = TRUE occurred because
GR-CLOSE-COMMAND-LOST-TIME-DELAY of GCU-1 = FALSE fired rule GR-CLOSE-COMMAND-
TIME-DELAY
at time 30.188

The conclusion GR-CLOSE-COMMAND-LOST-TIME-DELAY of GCU-1 = FALSE occurred because
GR-CLOSE-COMMAND of GCU-1 = TRUE fired rule GR-CLOSE-COMMAND-LOST-
TIME-DELAY
at time 30.164

The conclusion GR-CLOSE-COMMAND of GCU-1 = TRUE occurred because
GR-READY of GCU-1 = TRUE fired rule GR-CLOSE-COMMAND
at time 30.164

The conclusion GR-READY of GCU-1 = TRUE occurred because
POWER-READY-TIME-DELAY of GCU-1 = TRUE fired rule GR-READY
at time 30.164

The conclusion POWER-READY-TIME-DELAY of GCU-1 = TRUE occurred because
POWER-READY of GCU-1 = TRUE fired rule POWER-READY-TIME-DELAY
at time 30.164

The conclusion POWER-READY of GCU-1 = TRUE occurred because
UNDERVOLTAGE-UNDEREXCITATION-LATCH of GCU-1 = RESET fired rule POWER-READY
at time 30.020

The conclusion UNDERVOLTAGE-UNDEREXCITATION-LATCH of GCU-1 = RESET occurred
because
VOLTAGE-POR of IDG-1 = 115.0 fired rule UNDERVOLTAGE-UNDEREXCITATION-LATCH-
RESET
at time 30.020

VOLTAGE-POR of IDG-1 = 115.0 true from model.
```

```
KEE Typescript Window

The conclusion STATUS-COMMAND of ACXTR = OPEN occurred because
ACXTR-CLOSE-COMMAND of BCU-1 = FALSE fired rule ACXTR-ACTUATION
at time 30.208

The conclusion ACXTR-CLOSE-COMMAND of BCU-1 = FALSE occurred because
ACXTR-TRIP-SIGNAL of BCU-1 = TRUE fired rule ACXTR-CLOSE-COMMAND
at time 30.208

The conclusion ACXTR-TRIP-SIGNAL of BCU-1 = TRUE occurred because
EP-LFT-ONLINE of BCU-1 = TRUE fired rule ACXTR-TRIP-SIGNAL
at time 30.208

The conclusion EP-LFT-ONLINE of BCU-1 = TRUE occurred because
LFT-ONLY of BCU-1 = TRUE fired rule EP-LFT-ONLINE
at time 30.208

The conclusion LFT-ONLY of BCU-1 = TRUE occurred because
GEN1 of BCU-1 = TRUE fired rule LFT-ONLY
at time 30.208

The conclusion GEN1 of BCU-1 = TRUE occurred because
GEN1-ONLINE of BCU-1 = TRUE fired rule GEN1
at time 30.208

The conclusion GEN1-ONLINE of BCU-1 = TRUE occurred because
STATUS of GCB-1 = CLOSED fired rule GEN1-ONLINE
at time 30.208

STATUS of GCB-1 = CLOSED true from model.
```

KEE Typescript Window

The conclusion STATUS-COMMAND of EPR = OPEN occurred because
EPR-CLOSE-COMMAND of BCU-1 = FALSE fired rule EPR-ACTUATION
at time 30.625

The conclusion EPR-CLOSE-COMMAND of BCU-1 = FALSE occurred because
EPR-CLOSE-REQUEST of BCU-1 = FALSE fired rule EPR-CLOSE-COMMAND
at time 30.625

The conclusion EPR-CLOSE-REQUEST of BCU-1 = FALSE occurred because
RT-ONLY of BCU-1 = TRUE fired rule EPR-CLOSE-REQUEST
at time 30.625

The conclusion RT-ONLY of BCU-1 = TRUE occurred because
GEN4 of BCU-1 = TRUE fired rule RT-ONLY
at time 30.625

The conclusion GEN4 of BCU-1 = TRUE occurred because
GEN4-ONLINE of BCU-1 = TRUE fired rule GEN4
at time 30.625

The conclusion GEN4-ONLINE of BCU-1 = TRUE occurred because
STATUS of GCB-4 = CLOSED fired rule GEN4-ONLINE
at time 30.625

STATUS of GCB-4 = CLOSED true from model.

```
┌─────────────────────────────────────────────────────────────────┐
│ KEE Typescript Window                                           │
├─────────────────────────────────────────────────────────────────┤
│                                                                 │
│ The conclusion STATUS-COMMAND of GCB-4 = OPEN occurred because  │
│ GR-COMMAND-LATCH of GCU-4 = RESET fired rule GR-ACTUATION-COMMAND│
│ at time 30.999                                                  │
│                                                                 │
│ The conclusion GR-COMMAND-LATCH of GCU-4 = RESET occurred because│
│ GR-TRIP-COMMAND-2 of GCU-4 = TRUE fired rule GR-COMMAND-LATCH-RESET│
│ at time 30.999                                                  │
│                                                                 │
│ The conclusion GR-TRIP-COMMAND-2 of GCU-4 = TRUE occurred because│
│ GR-TRIP-COMMAND of GCU-4 = TRUE fired rule GR-TRIP-COMMAND-2    │
│ at time 30.999                                                  │
│                                                                 │
│ The conclusion GR-TRIP-COMMAND of GCU-4 = TRUE occurred because │
│ UNDERSPEED-TIME-DELAY of GCU-4 = TRUE fired rule GR-TRIP-COMMAND│
│ at time 30.999                                                  │
│                                                                 │
│ The conclusion UNDERSPEED-TIME-DELAY of GCU-4 = TRUE occurred because│
│ UNDERSPEED-LATCH of GCU-4 = SET fired rule UNDERSPEED-TIME-DELAY│
│ at time 30.849                                                  │
│                                                                 │
│ The conclusion UNDERSPEED-LATCH of GCU-4 = SET occurred because │
│ SPEED of IDG-4 = 2000 fired rule UNDERSPEED-LATCH-SET           │
│ at time 30.849                                                  │
│                                                                 │
│ SPEED of IDG-4 = 2000 true from model.                          │
│                                                                 │
└─────────────────────────────────────────────────────────────────┘
```

```
KEE Typescript Window
```

The conclusion STATUS-COMMAND of GCB-2 = OPEN occurred because
GR-COMMAND-LATCH of GCU-2 = RESET fired rule GR-ACTUATION-COMMAND
at time 32.631

The conclusion GR-COMMAND-LATCH of GCU-2 = RESET occurred because
GR-TRIP-COMMAND-2 of GCU-2 = TRUE fired rule GR-COMMAND-LATCH-RESET
at time 32.631

The conclusion GR-TRIP-COMMAND-2 of GCU-2 = TRUE occurred because
GCR-TRIP-COMMAND of GCU-2 = TRUE fired rule GR-TRIP-COMMAND-2
at time 32.631

The conclusion GCR-TRIP-COMMAND of GCU-2 = TRUE occurred because
OVERVOLTAGE-TIME-DELAY of GCU-2 = TRUE fired rule GCR-TRIP-COMMAND
at time 32.631

The conclusion OVERVOLTAGE-TIME-DELAY of GCU-2 = TRUE occurred because
OVERVOLTAGE-INVERSE-TIME-DELAY-CHECK-RULE of GCU-2 = TRUE fired rule
OVERVOLTAGE-TIME-DELAY
at time 32.631

The conclusion OVERVOLTAGE-INVERSE-TIME-DELAY-CHECK-RULE of GCU--2 = TRUE
occurred because
STATUS of IDG-2 = OVERVOLTAGE fired rule OVERVOLTAGE-INVERSE-TIME-DELAY-
CHECK-RULE
at time 32.583

STATUS of IDG-2 = OVERVOLTAGE true from model.

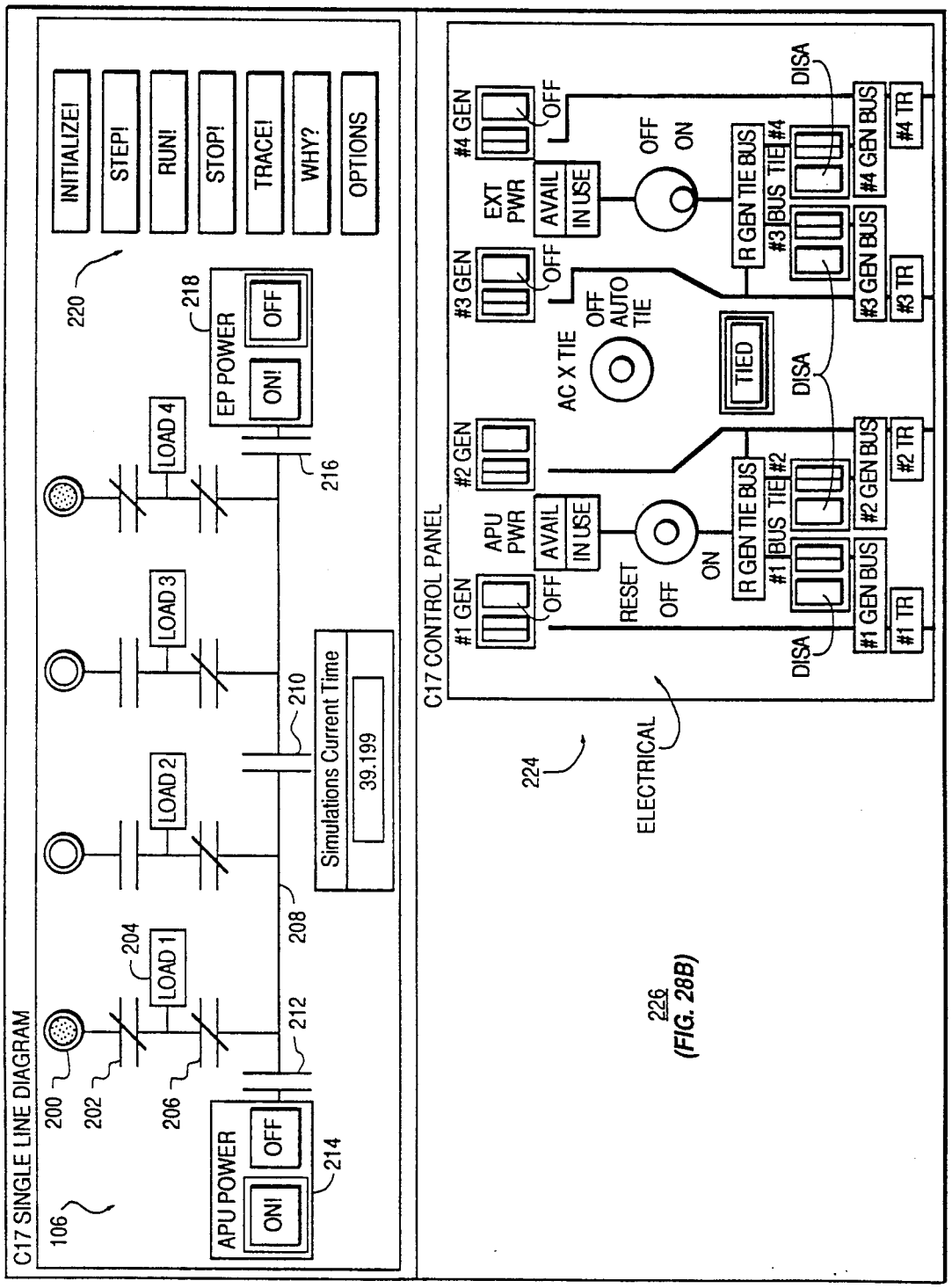

| KEE Typescript Window |
|---|
| FREQUENCY of IDG-3 = 450 true from model.<br>No more events in simulation calendar.<br>No more events in simulation calendar.<br>No more events in simulation calendar.<br>No more events in simulation calendar.<br>No more events in simulation calendar.<br>No more events in simulation calendar.<br>No more events in simulation calendar.<br>No more events in simulation calendar.<br>No more events in simulation calendar.<br>No more events in simulation calendar. |
| No more events in simulation calendar. |

| IDG Channel 3 | |
|---|---|
| Speed: | 8000 |
| Frequency: | 0.0 |
| POR Voltage: | 0.0 |
| Current: | 0.0 |
| Phase: | 0.0 |
| Status: | ok |

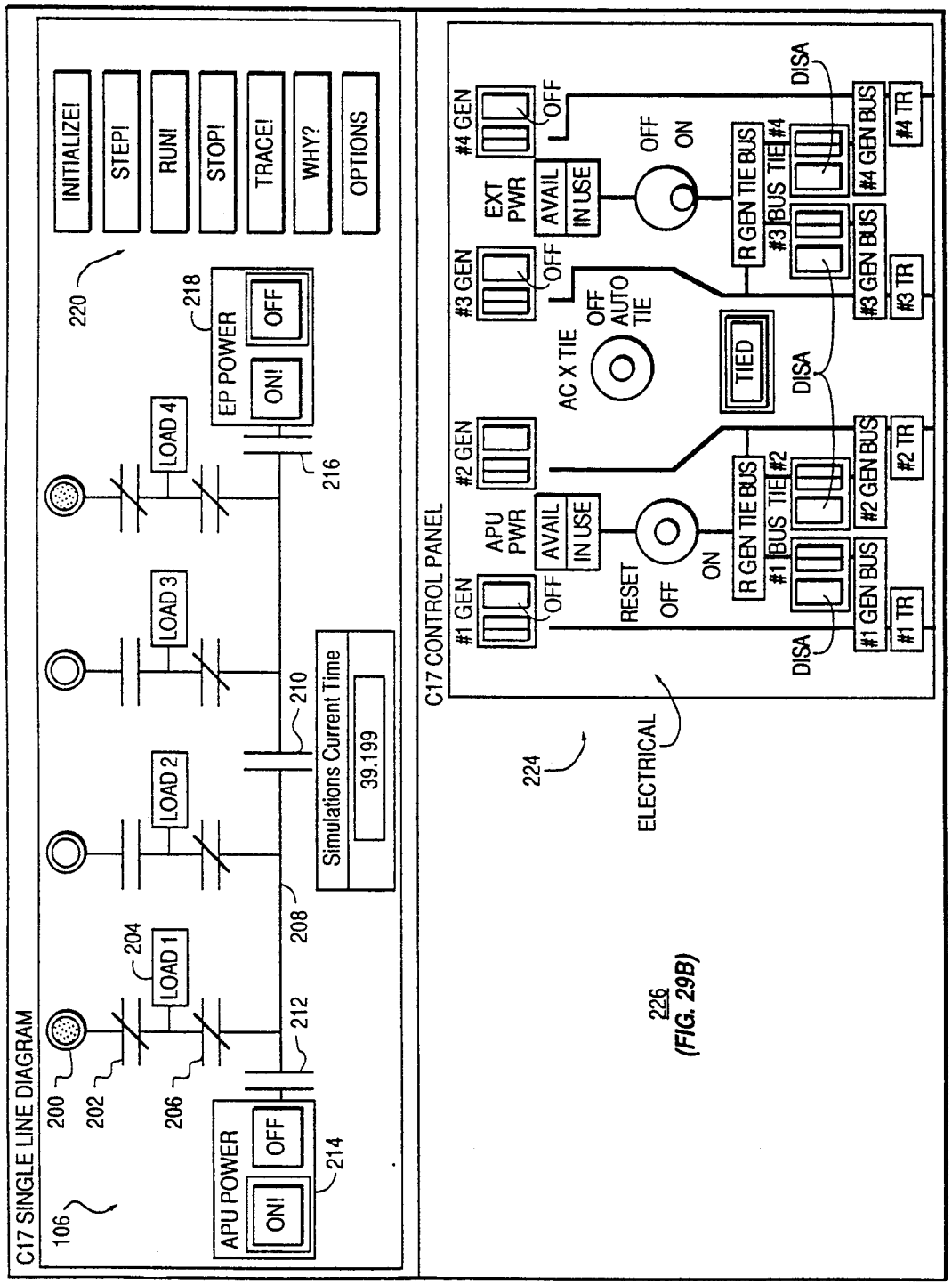

FIG. 29B

```
┌─────────────────────────────────────────────────────────────────────┐
│ KEE Typescript Window                                               │
├─────────────────────────────────────────────────────────────────────┤
│                                                                     │
│ The conclusion STATUS-COMMAND of GCB-3 = OPEN occurred because      │
│ GR-COMMAND-LATCH of GCU-3 = RESET fired rule GR-ACTUATION-COMMAND   │
│ at time 37.747                                                      │
│                                                                     │
│ The conclusion GR-COMMAND-LATCH of GCU-3 = RESET occurred because   │
│ GR-TRIP-COMMAND-2 of GCU-3 = TRUE fired rule GR-COMMAND-LATCH-RESET │
│ at time 37.747                                                      │
│                                                                     │
│ The conclusion GR-TRIP-COMMAND-2 of GCU-3 = TRUE occurred because   │
│ GCR-TRIP-COMMAND of GCU-3 = TRUE fired rule GR-TRIP-COMMAND-2       │
│ at time 37.747                                                      │
│                                                                     │
│ The conclusion GCR-TRIP-COMMAND of GCU-3 = TRUE occurred because    │
│ OVERFREQUENCY-2-TIME-DELAY of GCU-3 = TRUE fired rule GCR-TRIP-COMMAND │
│ at time 37.747                                                      │
│                                                                     │
│ The conclusion OVERFREQUENCY-2-TIME-DELAY of GCU-3 = TRUE occurred because │
│ OVERFREQUENCY-3 of GCU-3 = TRUE fired rule OVERFREQUENCY-2-TIME-DELAY │
│ at time 37.747                                                      │
│                                                                     │
│ The conclusion OVERFREQUENCY-3 of GCU-3 = TRUE occurred because     │
│ OVERFREQUENCY-2-LATCH of GCU-3 = SET fired rule OVERFREQUENCY-3     │
│ at time 37.699                                                      │
│                                                                     │
│ The conclusion OVERFREQUENCY-2-LATCH of GCU-3 = SET occurred because │
│ FREQUENCY of IDG-3 = 450 fired rule OVERFREQUENCY-2-LATCH-SET       │
│ at time 37.699                                                      │
│                                                                     │
│ FREQUENCY of IDG-3 = 450 true from model.                           │
│                                                                     │
└─────────────────────────────────────────────────────────────────────┘
```

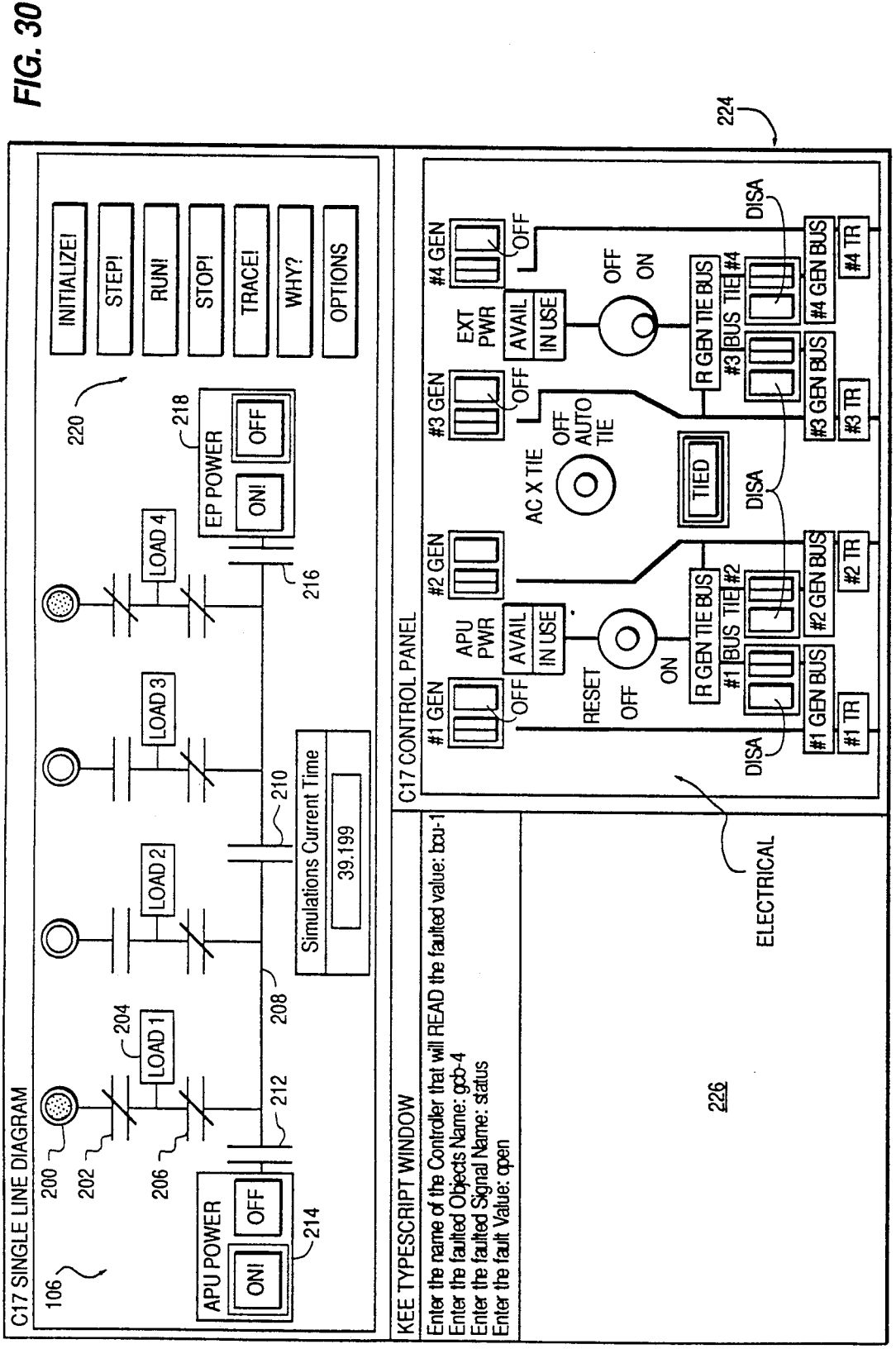

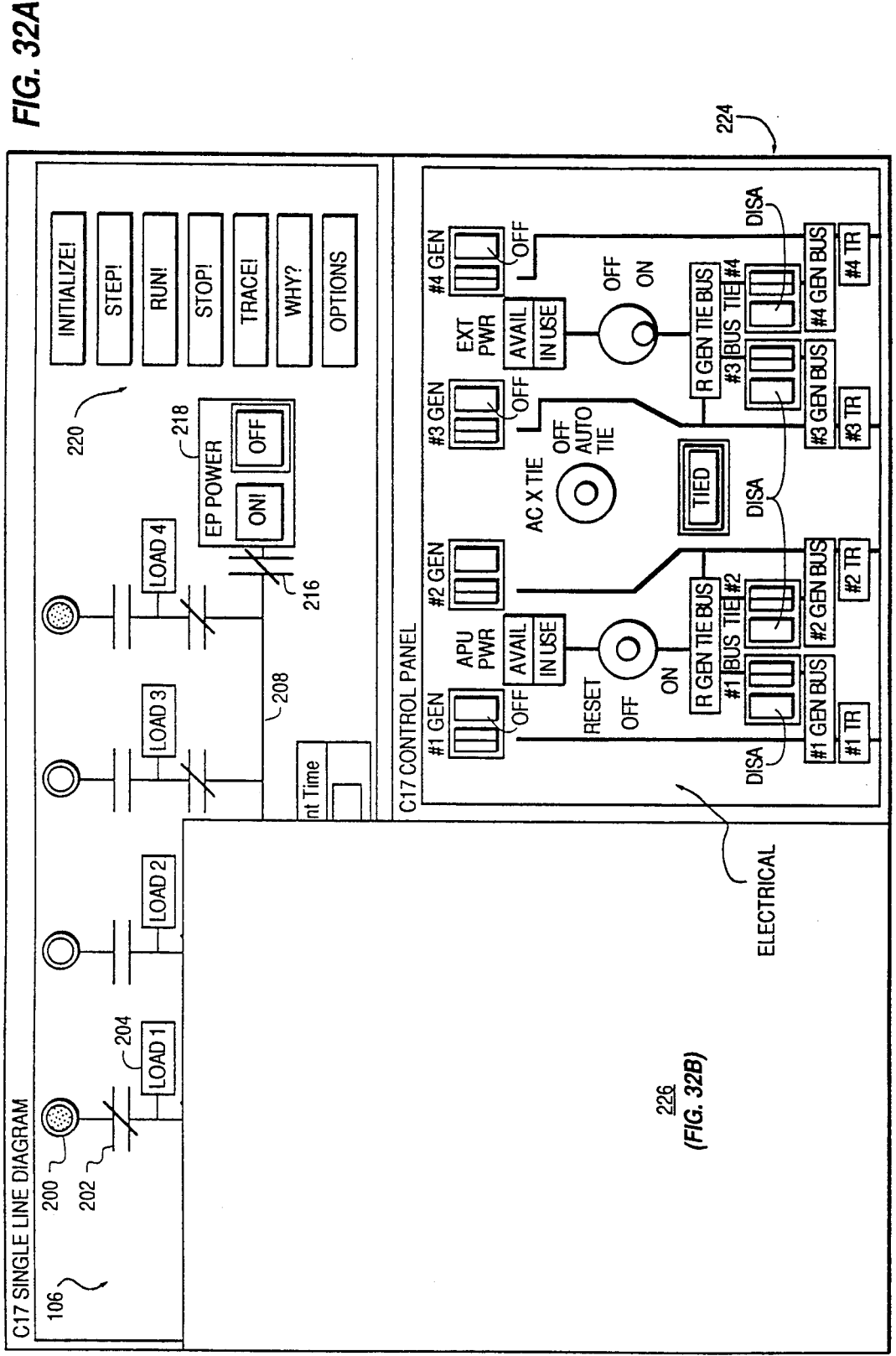

KEE Typescript Window

The conclusion STATUS-COMMAND of GCB-4 = OPEN occurred because
GR-COMMAND-LATCH of GCU-4 = RESET fired rule GR-ACTUATION-COMMAND
at time 39.256

The conclusion GR-COMMAND-LATCH of GCU-4 = RESET occurred because
GR-TRIP-COMMAND-2 of GCU-4 = TRUE fired rule GR-COMMAND-LATCH-RESET
at time 39.256

The conclusion GR-TRIP-COMMAND-2 of GCU-4 = TRUE occurred because
GR-CLOSE-COMMAND-TIME-DELAY of GCU-4 = FALSE fired rule GR-TRIP-COMMAND-2
at time 39.256

The conclusion GR-CLOSE-COMMAND-TIME-DELAY of GCU-4 = FALSE occurred because
GR-CLOSE-COMMAND-LOST-TIME-DELAY of GCU-4 = TRUE fired rule GR-CLOSE-COMMAND-
TIME-DELAY
at time 39.256

The conclusion GR-CLOSE-COMMAND-LOST-TIME-DELAY of GCU-4 = TRUE occurred because
GR-CLOSE-COMMAND of GCU-4 = FALSE fired rule GR-CLOSE-COMMAND-LOST-
TIME-DELAY
at time 39.256

The conclusion GR-CLOSE-COMMAND of GCU-4 = FALSE occurred because
GET-READY of GCU-4 = FALSE fired rule GR-CLOSE-COMMAND
at time 39.224

The conclusion GR-READY of GCU-4 = FALSE occurred because
GR-TRIP-LATCH of GCU-4 = SET fired rule GR-READY
at time 39.224

The conclusion GR-TRIP-LATCH of GCU-4 = SET occurred because
NO-BREAK-TRANSFER-TIME-DELAY of GCU-4 = TRUE fired rule GR-TRIP-LATCH-SET
at time 39.224

The conclusion NO-BREAK-TRANSFER-TIME-DELAY of GCU-4 = TRUE occurred because
NO-BREAK-TRANSFER-INIT of GCU-4 = TRUE fired rule NO-BREAK-TRANSFER-TIME-DELAY
at time 39.224

The conclusion NO-BREAK-TRANSFER-INIT of GCU-4 = TRUE occurred because
STATUS of EPR = CLOSED fired rule NO-BREAK-TRANSFER-INIT
at time 39.224

STATUS of EPR = CLOSED true from model.

KEE Typescript Window

The conclusion STATUS-COMMAND of EPR = CLOSED occurred because
EPR-CLOSE-COMMAND of BCU-1 = TRUE fired rule EPR-ACTUATION
at time 39.199

The conclusion EPR-CLOSE-COMMAND of BCU-1 = TRUE occurred because
EPR-CLOSE-REQUEST of BCU-1 = TRUE fired rule EPR-CLOSE-COMMAND
at time 39.199

The conclusion EPR-CLOSE-REQUEST of BCU-1 = TRUE occurred because
RT-ONLY of BCU-1 = FALSE fired rule EPR-CLOSE-REQUEST
at time 39.199

The conclusion RT-ONLY of BCU-1 = FALSE occurred because
GEN4 of BCU-1 = FALSE fired rule RT-ONLY
at time 39.199

The conclusion GEN4 of BCU-1 = FALSE occurred because
GEN4-ONLINE of BCU-1 = FALSE fired rule GEN4
at time 39.199

The conclusion GEN4-ONLINE of BCU-1 = FALSE occurred because
STATUS of GCB-4 = OPEN fired rule GEN4-ONLINE
at time 39.199

STATUS of GCB-4 = OPEN true from model.

EXPERT ELECTRICAL POWER SIMULATOR

Appendix

An appendix containing a program which may be used in practicing the present invention is within the file wrapper. The Appendix contains one hundred ninety-nine pages. The program may be used in a work station to practice the present invention. The subject matter of the program is copyrighted. A limited license is granted to anyone who requires a copy of the program disclosed herein for purposes of understanding or analyzing the present invention, but no license is granted to make a copy for any other purpose including the loading of a computer with code in any form or language.

TECHNICAL FIELD

The present invention relates to systems for simulating an electrical power generating system.

BACKGROUND ART

FIG. 1 illustrates a prior art power generating system of the type manufactured by the assignee of the present invention for use in airframes which is simulated by the present invention. The power generating system 10 is comprised of a plurality of generating units 12 each of which are coupled to a power take-off (not illustrated) from an airframe propulsion engine. Each generating unit 12 is conventional and is comprised of a permanent magnet generator which generates alternating current which is rectified and applied to a wound field exciter which produces alternating current which is rectified and applied to the rotor of a three phase alternator. As indicated by the numeric designation 1 ... n associated with each generator unit, the number of generator units varies directly with the number of engines in the airframe and typically is between 2 and 4. The rotor of the three phase alternator is driven by a constant speed transmission typically contained in an integrated drive generator (IDG) (not illustrated) which converts a variable speed power take-off from the airframe propulsion engine into a constant speed shaft drive which rotates the rotor of the three phase alternator at a velocity for producing three phase 400 Hz electrical power. Each generator unit 12 has an associated generator control unit 14 which contains a programmed microprocessor for implementing various conventional control and protection functions as well as functions which are described below which are part of the present invention. Further examples of electrical generating systems for an airframe are disclosed in U.S. Pat. Nos. 4,403,292, 4,488,198 and 4,684,873 which are assigned to the assignee of the present invention.

Generator control unit 14 is conventional. The generator control unit 14 contains a relay which controls the connection of electrical power generator by the permanent magnet generator to the wound field exciter which upon disconnection disables the generator unit from generating electrical power. A generator control current transformer 16 monitors the current generated by its associated generator unit 12. The generator control unit 14 uses the information from the generator control current transformer 16 and the system average current to determine the difference in current system average. Each generator control current transformer 16 is comprised of eight different current sensing windings. A generator control breaker 18 connects the generator to the load bus 20. A bus tie breaker 24 connects the generator control breaker 18 to the system power bus 26. The bus tie breaker 24 opening and closing is controlled by first signals on line 40 and the opening and closing of the generator control breaker 18 is controlled by second signals on line 22. The generator control breaker 18 and the bus tie breaker 24 may have different implementations which are responsive to first and second levels of a single signal or to multiple signals having multiple levels. A split system breaker 28 permits division of the system power bus 26 into two parts to permit independent operation of groups of one or more generator units 12 in parallel. One or more bus control units 30 provide control over the split system breaker 28. Furthermore, each bus control unit 30 may issue commands over control lines 32 to one or more generator control units 14 over which the bus control unit exercises supervisory control to control the switching status of either or both of the generator control breaker 18 and the bus tie breaker 24. The bus control units 30 also provide additional system protection no discussed herein through communications and hardware lines not illustrated.

An electrical power generating system such as that illustrated in FIG. 1 must provide a substantial amount of dependable power under very harsh operating conditions. The electrical power generating system must have the capability to analyze its operating condition and take actions to perform in an efficient and reliable manner. It must be able to detect faults in the electrical system and react in such a manner that prevents damage to the faulted area, while maintaining the power delivered to the operational components. To implement the necessary decision capabilities, typically over 500 rules and logic equations must be defined. These rules and equations are the heart of an electrical power generating system such as that illustrated in FIG. 1.

Currently the design of aircraft electrical power generating systems is slow and time consuming. Typically, problems are found to exist after a system is partially designed or tested. Solving problems requires time which causes design time tables to slip and development costs to increase.

A need exists for a simulator which simulates the operation of an electrical power generating system including simulating a state of the elements of the electrical power generating system during generation of electrical power and a state of elements of the electrical power generating system in response to a fault condition. A simulator would permit the designer of an electrical power generating system to identify problems and propose a solution(s) to the problems prior to substantial activities having been undertaken in the design phase. As a result the efficiency of the design of an electrical power generating system would be improved by providing a simulator Representing the behavior of the electrical power generating system to be designed prior to the actual fabrication of hardware and the writing of control software.

DISCLOSURE OF THE INVENTION

The present invention is a simulator of an electrical power generating system. The invention includes a programmed simulator specifying at least one electrical power generating element for generating electrical power and at least one contactor for connecting the at least one electrical power generating element to at least one load bus. The simulator specifies a state of the elements of the electrical power generating system during generation of electrical power. The simulator further specifies a state of the elements of the electrical power generating system in response to a fault condition. An input inputs data to the programmed simulator relating to the simulated operation of the electrical power generating system. An output outputs data from the programmed simulator including a display for displaying data outputted from the simulator relating to simulated operation of the electrical power generating system. With the invention contactor logic is simulated as a collection of rules according to which the simulated electrical power generating system responds to changing modes of operation and fault conditions. The invention permits the designer of an electrical power generating system to simulate the needed rules of operation and logic equations without building an implementation of the electrical power generating system. The simulator permits the designer to manually analyze the response of the electrical power generating system which is being designed to various conditions, disturbances and/or faults. The simulator permits simulation of complex electrical power generating systems housing multiple generating units for use in airframes in which analysis and verification of operation by the building of an actual electrical power generating system is difficult, time consuming and expensive.

The simulator of an electrical power generating system in accordance with the present invention permits correcting of one problem and seeing the result of the correction which may create several other problems in a preferred electrical power generating system. As a result a preferred design change in a preferred electrical power generating system may be implemented in the simulator which permits the designing of system operation and contactor control logic in a fast and cost effective manner.

The simulator permits a link to be made between the design of the system and the software control implementation of the contactor logic. The simulator permits the specification of preferred detailed control software specifications.

The simulator implements logic with a combinatorial description, fixed time delays, one-shot logic and latched states. The simulator using the aforementioned simulation of the electrical power generating system permits the specification of the system which facilitates the transition from the control specification to actual software.

The display associated with the output of the simulator displays the change in state of the elements in response to changed operating conditions. Different states of the elements of the simulated electrical power generating system are illustrated such as open and closed contactors, operation of electrical power generating elements, activation and connection of an auxiliary power generating unit to the electrical power generating system bus, and activation of and connection of external power to the electrical power generating system. The input inputs a change of state of the simulated operation of the simulated electrical power generating system to the programmed simulator which responds to the changed operational state(s) and outputs a display illustrating the changed state of the aforementioned illustrated elements of the simulated electrical power generating system. Furthermore, the programmed simulator outputs justification of the conditions which are necessary to cause the displayed current state of the operation of the system which resulted from the input of a changed state of simulated operation of the electrical power generating system. The illustration on the display of the justification provides the designer with a specification of the system conditions which are necessary for the displayed state of the simulated electrical power generating system to occur.

A simulator of an airframe electrical power generating system in accordance with the invention includes a programmed electrical power system simulator specifying at least one simulated airframe electrical power generating element for generating electrical power and at least one contactor for connecting the at least one electrical power generating element to at least one simulated airframe load bus, a state of the at least one electrical power generating element, contactor and load bus of the electrical power generating system during simulated generation of electrical power and the state of the at least one electrical power generating system element, contactor and load bus of the electrical power generating system in response to a simulated fault condition; an input for inputting data to the programed simulator relating to the simulated operation of the electrical power generating system; and an output for outputting data from the programmed simulator including a display for displaying data outputted from the simulator relating to simulated operation of the electrical power generating system. A plurality of states of the electrical power generating system during generation of electrical power may be simulated including that a plurality of electrical power generating elements are connected in parallel during simulated generation of electrical power by the electrical power generating system; the state of the electrical power generating system is changed so that power from different electrical power generating elements is sequentially connected to different load buses; the state of the electrical power generating system is changed to cause a break transfer to a load bus between a plurality of electrical power generating elements; and the state of the electrical power generating system is changed to cause a no break transfer to a load bus between a plurality of electrical power generating elements. A plurality of fault conditions may be simulated which include a maximum frequency of electrical power which may be generated by a simulated electrical power generating element of the electrical power generating system, a minimum frequency of electrical power which may be generated by a simulated electrical power generating element of the electrical power generating system, a maximum voltage which may be generated by a simulated electrical power generating element of the electrical power generating system, a minimum voltage which may be generated by a simulated electrical power generating element of the electrical power generating system, a maximum current which may be generated by a simulated electrical power generating element of the electrical power generating system, a simulated sensed difference in current flow measured between two points in the simulated electrical power generating system, an under excitation of a field winding of one of the simulated electrical power generating elements is present, an overexcitation of a field winding of one of the simulated electrical power generating elements is present and one simulated electrical power generating element is driving another simulated electrical power generating element which is operating as a motor.

The display displays reasons why a state of an element changed in response to a change in at least one parameter of system. The element which changed state may be displayed on the display.

Alternatively the programmed simulator specifies at least one electrical power generating element for generating electrical power and at least one contactor for connecting the at least one electrical power generating element to at least one load bus and a state of the elements of the simulated electrical power generating system during simulated generation of electrical power or a state of elements of the simulated electrical power generating system in response to a simulated fault condition.

BRIEF DESCRIPTION OF THE DRAWINGS

FIG. 2 illustrates a block diagram of a simulator for an electrical power generating system in accordance with the present invention;

FIG. 3 illustrates operators which are used with the present invention;

FIG. 4 illustrates values which may be used with the operators of FIG. 3;

FIGS. 16-37 illustrate various displays of the operation of a simulator of an electrical power generating system in accordance with the present invention.

BEST MODE FOR CARRYING OUT THE INVENTION

FIG. 2 illustrates a block diagram of a simulator 100 of an electrical power generating system in accordance with the present invention. The simulator 100 is comprised of an input 102, which may be any suitable input of data including a keyboard or other device for entering encoded data, a programmed electrical power system simulator 104 which is a programmed processor containing a program in accordance with the program set forth in the above-referenced Appendix and an output 106 with display which receives output data from the programmed electrical power system simulator 104 which is displayed for usage by an operator utilizing the simulator 100. It should be understood that the invention is not limited to utilizing the program set forth in the attached Appendix. Furthermore, while the attached Appendix is written in the LISP programming language it, should be understood that any form of program data processor may be utilized in practicing the present invention.

Figure 1:
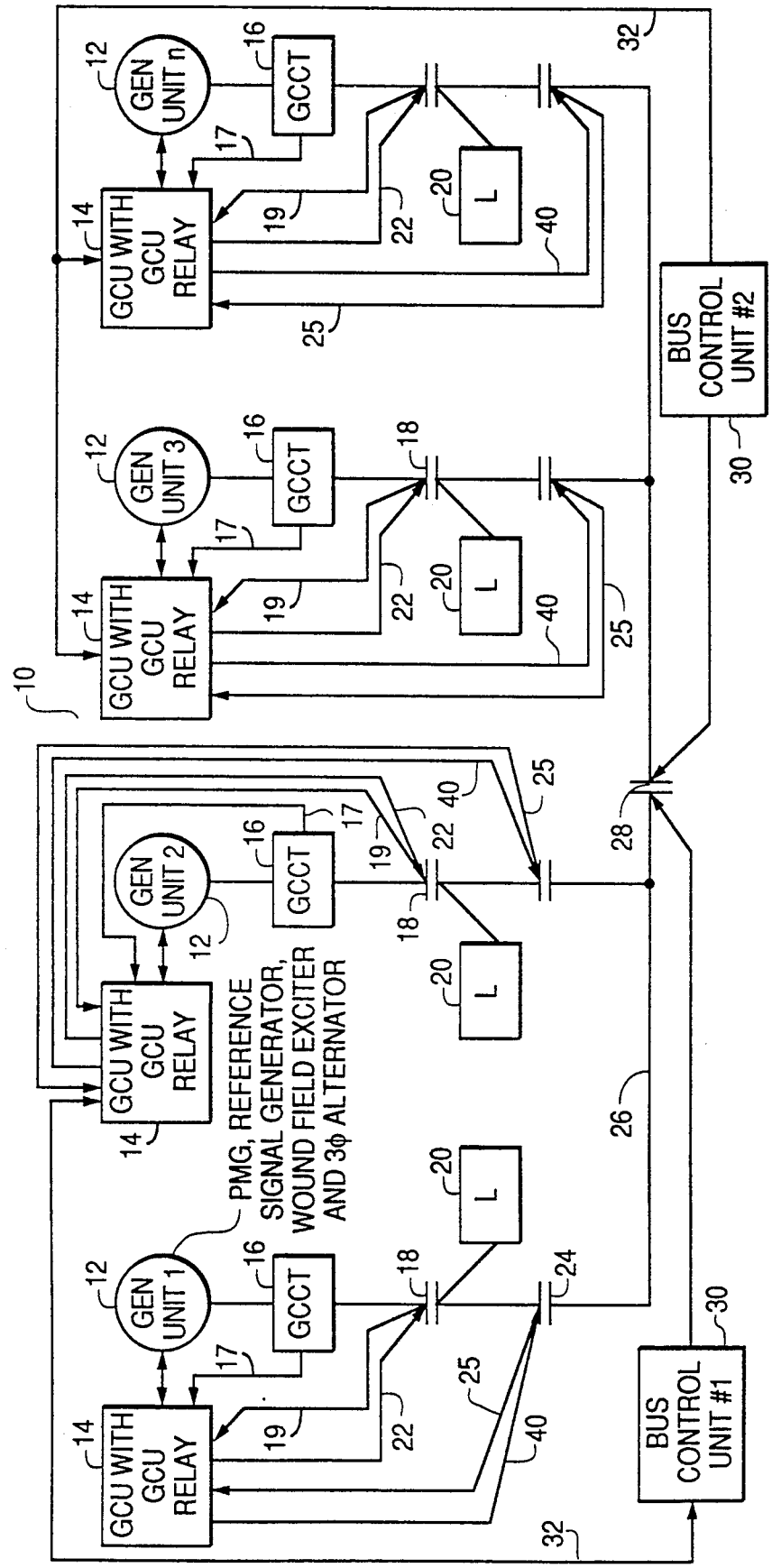
FIG. 1 illustrates a prior art electrical power generating system for an airframe of the type manufactured by the assignee of the present invention.

The programmed electrical power system simulator 104 performs a plurality of functions. The programmed simulator 100 specifies at least one electric power generating element for generating electrical power and at least one contactor for connecting the at least one electrical power generating element to at least one load bus. The elements which may be simulated are of the type set forth above in the description of the prior art of FIG. 1. However, it should be understood that the present invention is not limited to the simulation of an airframe electrical power generating system. Furthermore, the programmed simulator 104 simulates a state of the elements of the electrical power generating system during simulated generation of electrical power. The simulated states include, without limitation, whether one or more electrical power generating elements are being simulated in a state in which electrical power generation is being generated, whether one or more contactors are in an open or closed condition, whether an auxiliary power unit (APU) is in an on-state and connected to an electrical power bus contained within the simulated electrical power generating system and whether external power is on and connected to a load bus of the simulated electrical power generating system. The input 102 functions to input data to the programmed electrical power system simulator 104 relating to the simulated operation of the electrical power generating system. The output 106 outputs data from the programmed electrical power system simulator 104 including a display for displaying data outputted from the simulator relating to simulated operation of the electrical power generating system.

The programmed electrical power system simulator 104 is used to simulate the state of a plurality of elements contained in the simulated electrical power generating system 100. Without limitation the following states may be simulated. One simulated state is that a plurality of electrical power generating elements are connected in parallel during simulated generation of electrical power by the electrical power generating system. Another state is that the state of the elements of the electrical power generating system is changed so that power from different electrical power generating elements is sequentially connected to different load buses. Another state is that the state of the elements of the electrical power generating system is changed to cause a break transfer to a load bus between a plurality of electrical power generating elements. A break transfer is where no electrical power generating elements are connected in parallel. Another state of the elements of the electrical power generating system is that the state of the elements is changed to cause a no break transfer to a load bus between a plurality of electrical power generating elements. A no break transfer is when individual electrical power generating elements are momentarily connected in parallel.

The programmed electrical power simulator 104 simulates different fault conditions which may be present in the simulated electrical power generating system. One fault condition is a maximum frequency of electrical power which may be generated by an electrical power generating element of the simulated electrical power generating system such as the maximum frequency set forth in the overprotection block of FIG. 14. Another fault condition is a minimum frequency of electrical power which may be generated by an electrical power generating element of the simulated electrical power generating system as set forth in the under frequency protection block of FIG. 15. Another fault condition is a maximum voltage which may be generated by an electrical power generating element of the simulated electrical power generating system. Another fault condition is a minimum voltage which may be generated by an electrical power generating element of the simulated electrical power generating system. Another fault is a maximum current which may be generated by an electrical power generating element of the simulated electrical power generating system. Another fault is a simulated sensed difference in current flow measured between two points in the simulated electrical power generating system. Another fault is an under excitation of a field winding of one of the electrical power generating elements of the simulated electrical power generating system. Another fault is that one electrical power generating element is driving another electrical power generating element which is operating as a motor in the simulated electrical power generating system.

The display 106 functions to display reasons why a state of an element changed in response to an input change in at least one parameter of the system operation of the simulated electrical power generating system. The statement of reasons specifies why the current state of the simulated electrical power generating system changed from the previous simulated state of the system. Examples illustrating justification for the current state of the simulated operating system are set forth in FIGS. 19B, 20B, 21B, 24B, 27B, 29B, 32B and 33B which are discussed below.

Writing Rules for Simulating An Electrical Power Generating System

The generic syntax of rules used to simulate the programmed electrical power system simulator 104 follows an IF/THEN format as shown below.

---
Syntax:
(rule-type rule-name
if
premise
then
conclusion)

---

Indentation is used for easier viewing and is not required for proper operation of the programmed electrical power system simulator 14.

For systems with multiple channels, such as the C-17, aircraft as illustrated in FIGS. 16-37 below, only one set of rules needs to be written for all channels. That is, one set of rules needs to be written for the generator control units (GCU) and one set needs to be written for the bus control units (BCU). First, the premise and conclusion will be discussed. Second, a description of rule-names and rule-types will be given. Finally, an explanation on the use of parentheses will be provided.

Premise and Conclusion

The syntax for both the premise and conclusion is identical. The only distinction of the two is whether it follows the "if" command (premise), or the "then" command (conclusion). Parameters for the premise and conclusion include a signal-name (or attribute of the signal-name), unit-type, channel-number, an operator, and a value. All parts of the simulated electrical power generating system can be referenced using these parameters. However, the premise and conclusion do not have to contain all these parameters to be complete, but they do need a signal-name, an operator, and a value. An explanation of each parameter follows:

| | |
|---|---|
| Signal-name: | Signal-name refers to signals found on the logic diagram. A signal-name can be a word phrase, or acronym. Restrictions include: a) The signal-name must be continuous. (e.g., GCR-TR-COM or GCR_TR_COM, not GCR TR COM) b) The signal-name cannot contain any parentheses. |
| Unit-type: | The unit-type refers to elements of the electrical power generating system. Unit types include: |
| GCU | generator control unit |
| BCU | bus control unit |
| IDG | integrated drive generator |
| FEEDER-BUS | |
| GENERATOR-BUS | |
| TIE-BUS | |
| GR | generator relay |
| GCB | generator control breaker |
| BTR | bus tie relay |
| BTB | bus tie breaker |
| Channel-number: | The channel-number is used to reference signal-names or unit-types of a specific channel of the electrical power generating system. The channel numbers include: |
| CHANNEL-1 | |
| CHANNEL-2 | |
| CHANNEL-3 | |
| CHANNEL-4 | |
| Operator: | An operator compares the signal-name to a predetermined value. The operators include the operators of FIG. 3. |

NOTE: A blank space must come before and after the operator.

| | |
|---|---|
| Value: | The value is what which the signal name is compared. FIG. 4 illustrates the values which can be used and the corresponding operators. Once a value is assigned to a signal-name, whether it is in a premise or a conclusion, the signal-name must adhere to that value or its inverse in all other rules in which it is used. For example, if GCR-TR-COM is defined in a premise as being TRUE, then GCR-TR-COM must be defined as either TRUE or FALSE in all other rules in which it is used. |

The following formats illustrate how to use these parameters in premises and conclusions when writing rules.

1) To reference a signal in the GCU or BCU:
   Syntax:
      signal-name operator value
   Example:
      gr-ready = true
2) To reference a signal in a unit-type:
   Syntax:
      The signal-name of the unit-type Operator value
   Examples:
      The status of the gr = open
      The status of the acxtr-switch = tie
      The frequency of IDG-1 < 400.0

The words "of" and "the" are used for easier reading of the rules. They do not interfere with the operation of the software and may be omitted if desired.

3) To reference a signal in a specific channel:
   Syntax:
      The signal-name of the unit-type of channel-number operator value -continued Examples:
    The phase of the IDG of
      channel-1 > 40
    The POR-voltage of the IDG of
      channel-2 < 80
    The status of the GR of
      channel-4 = closed

Rule-name

Figure 5:
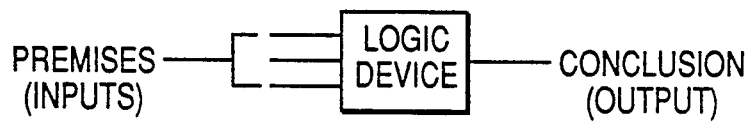
FIG. 5 illustrates a rule name in accordance with the present invention.

A rule-name is similar to the signal-name found in premises and conclusions. That is, a rule-name can be any word, phrase, or acronym found on the logic diagram. The rule-name, however, is the signal for which the rule is being written. Another way of stating that is: The rule-name references a particular rule, the premises are the inputs, and the conclusion determines the value of the output as illustrated in FIG. 5.

In order to operate some of the features of the simulator of the present invention easily, such as the TRACE! command described below, the rule-name should be the same as the signal-name in the conclusion.

Figure 6:
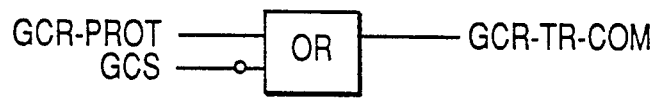
FIG. 6 illustrates a rule with a signal name changing value in the premise.

The evaluation of rules during a simulation is as follows: When a signal-name (or attribute) in a premise changes value, the rules containing that premise are automatically evaluated. If the simulated values are the same as the values stated in the premises (inputs), then the signal-name in the conclusion (output) takes on the value stated in the conclusion. If the simulated values are different then the values stated in the premises (inputs), then the signal-name in the conclusion (output) takes on the inverse of the value stated in the conclusion as illustrated in FIG. 6.

Set forth below is the rule illustrated in FIG. 6.

```
(basic gcr-tr-com
    if
gcr-prot = true
    or
gcs = off
    then
gcr-tr-com = true)
```

During a simulation, when 'gcr-prot' or 'gcs' changes its value, the rule 'gcr-tr-com' is automatically evaluated. If the simulated value of 'gcs' is off, then the value of 1 gcr-tr-com' will be true. Otherwise, the value of 'gcr-tr-com' will be false.

Rule-type

The rule-type determines the kind of logic device the rule will use. Four rule-types are provided in the simulator with the invention not being limited thereto. The rule-types include BASIC, FIXED-TIME-DELAY, ONE-SHOT, and LATCH.

BASIC

The BASIC rule-type is for combinational logic, such as AND and OR gates. The syntax is shown below.

```
Syntax:
(basic
    if
premise
    then
conclusion)
```

The operation of BASIC rule-types is described below.

```
basic gcr-tr-com
    if
GCR-prot = true
    or
GCS = off
    then
GCR-tr-com = true)
```

Set forth below are other examples of BASIC rules.

Examples:
```
(basic ap-ep-on-tie-bus
    if
(GCR-12-34* = false
    and
the status of the EPR = closed
    and
status of weight-on-wheels = true)
    or
(the status of the EPR = closed
    and
GCU-12-34* = true
    and
status of the ALXTR = closed)
    or
(the status of the ACXTR = closed
    and
gcu-12-34* = false
    and
the status of the APR = closed)
    or
(the status of the APR = closed
    and
GCU-12-34* = true)
    then
ap-ep-on-TIE-BUS = true)
(basic power-ready
    if
the phase sequence of the IDG = correct
    and
underspeed-latch = reset
    and
overfrequency-1 = false
    and
underfrequency-latch = reset
    and
overvoltage-overexcitation-latch = reset
    and
undervoltage-underexcitation-latch = reset
    then
power-ready = true)
```

Fixed-Time Delay

Figure 7:
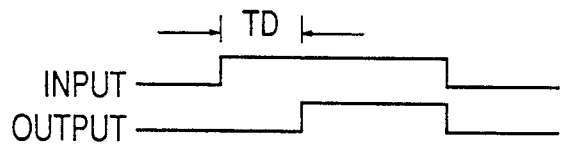
FIG. 7 illustrates a fixed time delay in accordance with the present invention.

A FIXED-TIME-DELAY is combinational logic which executes time delays. When a signal-name changes its value during a simulation, the premises containing that signal-name are evaluated. In order for the conclusion to be implemented, the simulated values must remain the same as the values in the premises for a specified length of time. If the simulated values change before the time delay is over, the conclusion will not be implemented. However, when the simulated values change back to their non-active state, the conclusion will change back instantaneously. FIG. 7 illustrates when the input and output are active high signals.

The time delay is specified in seconds. In the syntax below, the word 'seconds' is included for clarity; it is not a necessary part of the syntax.

```
Syntax:
(fixed-time-delay rule-name
    if
        premise
        for
```

Figure 8:
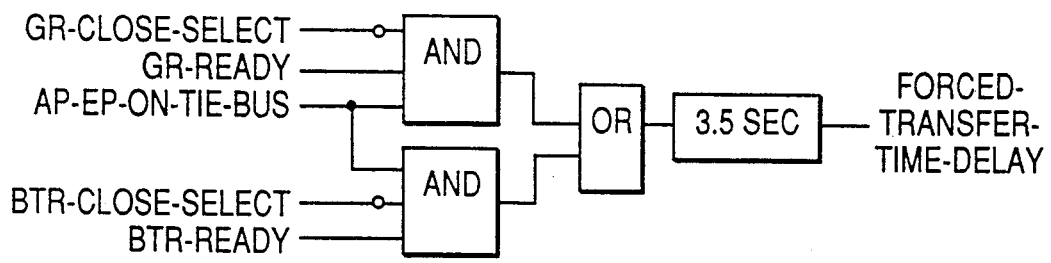
FIG. 8 illustrates a rule containing a time delay in accordance with the present invention.

FIG. 8 illustrates a time delay for the signal 'forced-transfer-time-delay'. Set forth below is the rule implementing the function of FIG. 8.

```
(fixed-time-delay forced-tranfer-time-delay
    if
        GR-close-select = false
    and
        GR-ready = true
    and
        ap-ep-on-tie-bus = true)
    or
        (ap-ep-on-tie-bus = true
    and
        BTR-close-select = false
    and
        BTR-ready = true)
    for
        3.5 seconds
    then
        forced-transfer-time-delay = true)
```

To obtain an inverse time delay, use the STATUS attribute of the IDG. In the embodiment implemented in the program of the Appendix, only the overvoltage protection function generates an inverse time delay.

One-Shot

The ONE-SHOT will deliver a false to true to false (low to high to low) signal on its output for a rising or falling edge on its input. When the value of a signal referred to in a premise changes, the premise is evaluated. If the simulated value is the same as the value in the premise, a one shot is executed on the output. If the simulated value is different than the value in the premise, the one shot is not executed. The duration of the one-shot is instantaneous; that is, no simulation time elapses during the false to true to false transition.

```
Syntax:
(one-shot rule-name
    if
        premise
    then
        fire)
```

The word "fire" is not a necessary part of the syntax. It is included to make the operation of the one-shot more apparent. Since the one-shot does no contain a standard conclusion, the rule-name becomes the signal which is created and changed during rule simulation as set forth in FIG. 9.

Figure 9:
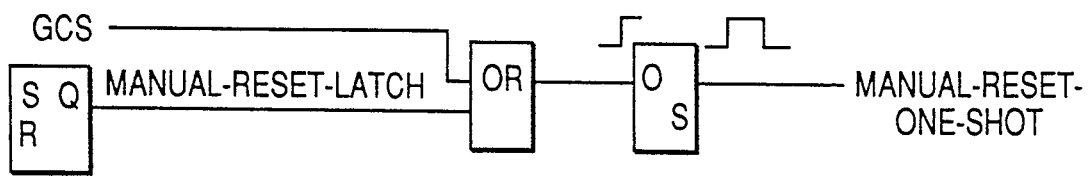
FIG. 9 illustrates a rule containing a one shot in accordance with the present invention.

Set forth below is the rule implementing the function of FIG. 9.

```
(one-shot manual-reset-one-shot
    if
        the gcs = true
    or
        the manual-reset-latch = set
    then
        fire)
```

Latch

The LATCH is a simple set-rest type latch. The rule is divided into 2 parts, one part is for setting the latch and another part is for resetting the latch, as shown below.

```
Syntax:
(latch latch-name
    if
        premise-1
    then
        set latch
    if
        premise-2
    then
        reset latch)
```

Figure 10:
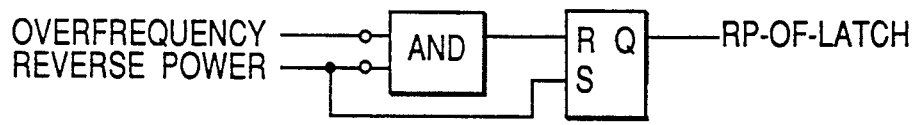
FIG. 10 illustrates a rule containing a latch in accordance with the present invention.

As with the other three rule-types, if the value of a signal-name changes, the premises with that signal-name are evaluated. If the simulated values are the same as the value in premise-1, the latch is set. If the simulated values are the same as the values in premise-2, the latch is reset. Otherwise, the latch remains in is current state. FIG. 10 illustrates a rule simulation containing a latch.

Set forth below is the rule implementing the function of FIG. 10.

```
(latch-rp-of-latch
    if
        reverse-power = true
    then
        set latch
    if
        overfrequency = false
    and
        reverse-power = false
    then
        reset latch)
```

The order of the set and reset sub-rules is irrelevant.

Figure 11:
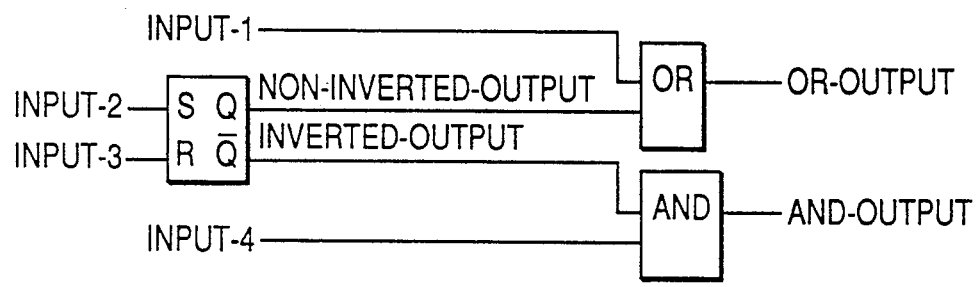
FIG. 11 illustrates a rule with an inverted Q output from a latch.

If the inverted Q output on the latch is desired, the rule describing the latch remains the same, but he rule following the latch will have the premise inverted. FIG. 11 illustrates a rule simulation with an inverted Q output.

Set forth below is the rule implementing the function of FIG. 11.

```
(latch example-latch
    if
        input-3 = true
    then
        reset latch
    if
        input-2 = true
    then
        set latch)
(basic or-output)
    if
        input-1 = true
    or
        non-inverted-output = set (notice the
            'set' term)
    then
        or-output = true)
(basic and-output
    if
        inverted-output = reset (notice the
            'reset' term)
    and
        input-4 = true
```

-continued
```
    then
        and-output = true)
Each rule must be enclosed in parentheses, as
shown above.
```

Parentheses

Figure 12:
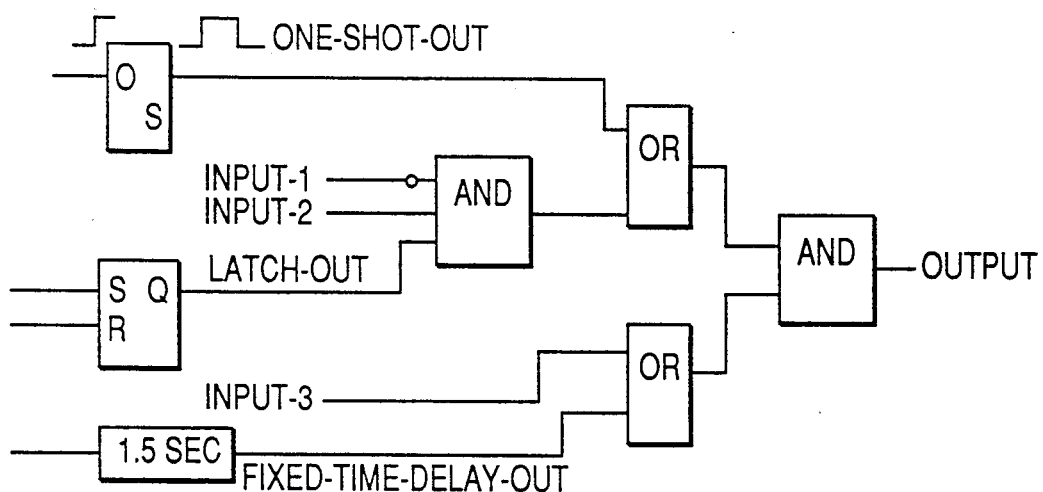
FIG. 12 illustrates a rule which is expressed with nesting with parentheses in accordance with the present invention.

The purpose of parentheses is to nest parts of a logic diagram, so that a separate rule does not have to be written for each logic gate. Nesting can be carried out until a FIXED-TIME-DELAY, ONE-SHOT, or LATCH is encountered. FIG. 12 illustrates an example of a rule which is specified with parentheses.

By nesting with parentheses, the rule for the above logic would look like this:

```
(basic output
    if
        ((input-1 = false
        and
            input-2 = true
        and
            latch-out = set)
        or
            one-shot-out = true)
        and
            (input-3 = true
        or
            fixed-time-delay-out = true)
    then output = true)
```

Figure 13:
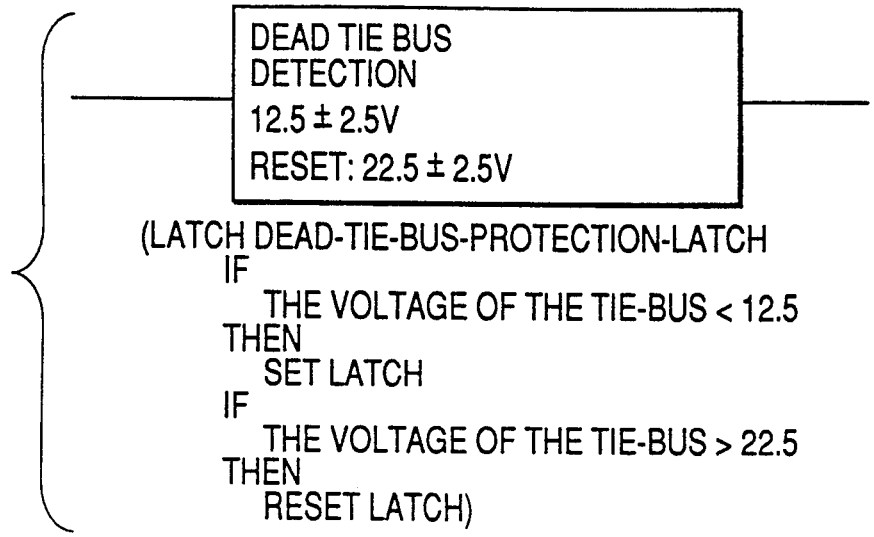
FIGS. 13-15 illustrate definition blocks which are used for representing faults in accordance with the present invention.
Figure 14:
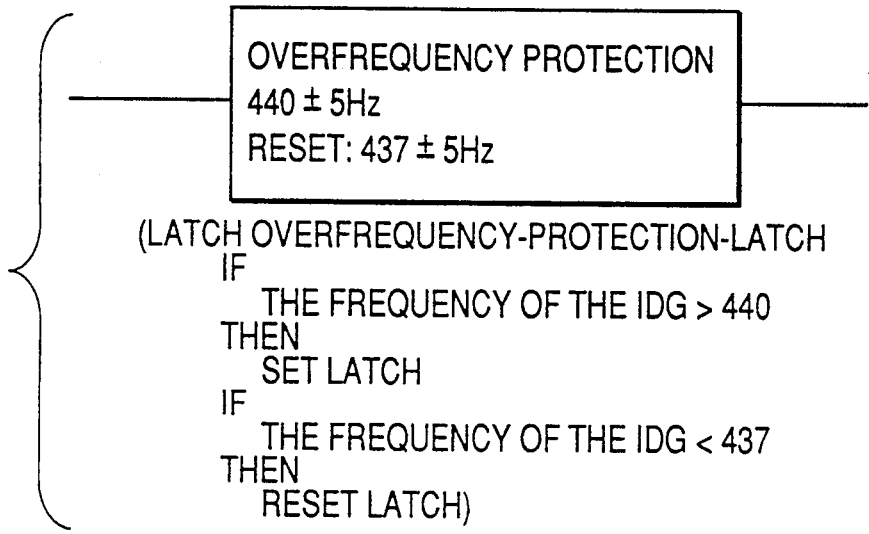
Figure 15:
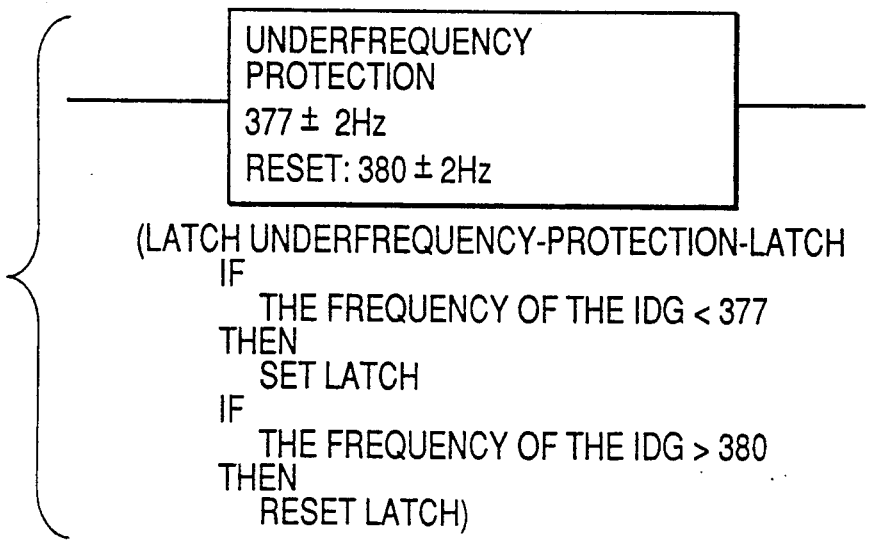

Examples of definition blocks used in the programmed electrical power system simulator for faults are expressed as set forth in FIGS. 13-15.

FIGS. 16-37 illustrate displays generated on the output 106 by the execution of the program set forth in the above-referenced Appendix in the programmed electrical power system simulator 104. Like reference numerals identify the parts throughout.

Figure 16:
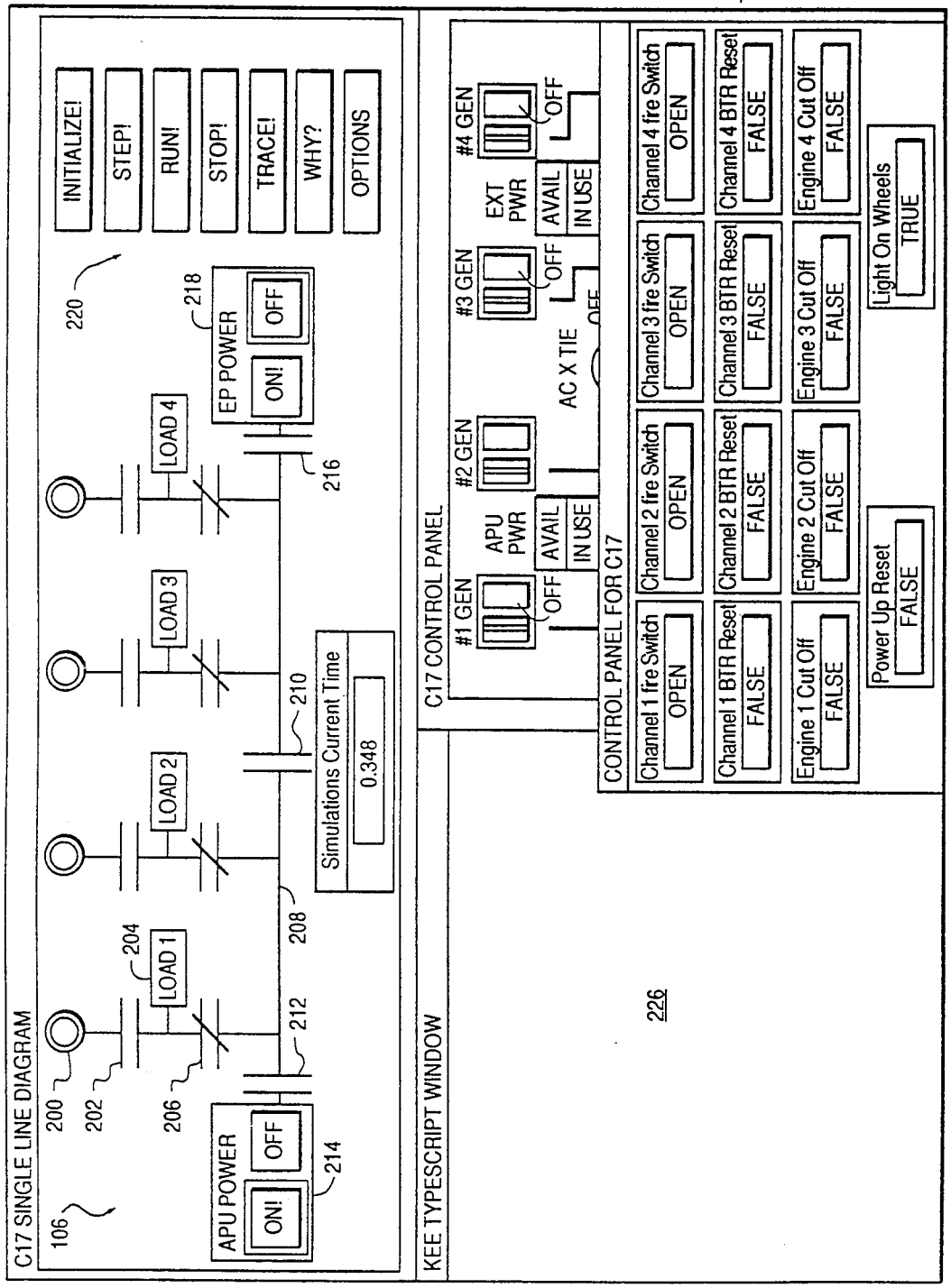

FIG. 16 illustrates the display 106 of the present invention illustrating the simulation of an electrical power generating system in a C-17 aircraft when no power is available, the aircraft is on the ground and all engines are running. The simulated system contains four electrical power generating elements 200 which simulate the generating units 12 of FIG. 1, four generator control relays 202 which simulate the contactors of FIG. 1, four electrical loads 204 which simulate the electrical loads 20 of FIG. 1, four tie bus control breakers 206 which correspond to the bus control breakers 24 of FIG. 1, a system power bus 208 which simulates the system bus 26 of FIG. 1 and a system breaker 210 which simulates a system breaker 28 of FIG. 1. A simulated contactor 212 permits the simulated connection of an auxiliary power unit 214 to the system bus 208 and a simulated contactor 216 permits the simulated connection of an external power source 218 to the system bus 208. Contactors which are closed are signified by an interconnecting line such as that illustrated with respect to the bus tie breaker 206.

Operation of the system is controlled by an ICON driven display. A plurality of blocks 220 signify functions which are selected by a movable mouse. The input 102, programmed electrical power system simulator 104 and output with display 106 may be implemented on a conventional work station such as a SUN3 manufactured by Sun Microsystems or a VAX Station 3200 computer manufactured by Digital Equipment corporation.

The display portion 224 simulates the display of the aircraft cockpit for which the electrical power generating system is being simulated. Lightening of such as the "OFF" box associated with the auxiliary power unit 214, and the "OFF" box associated with the external power source 218 signifies that the function of he box is true. The darkening of a labeled generating element 200 and load 204 indicates that the function is not true such as the illustrated electrical power generating elements 200.

Figure 22:
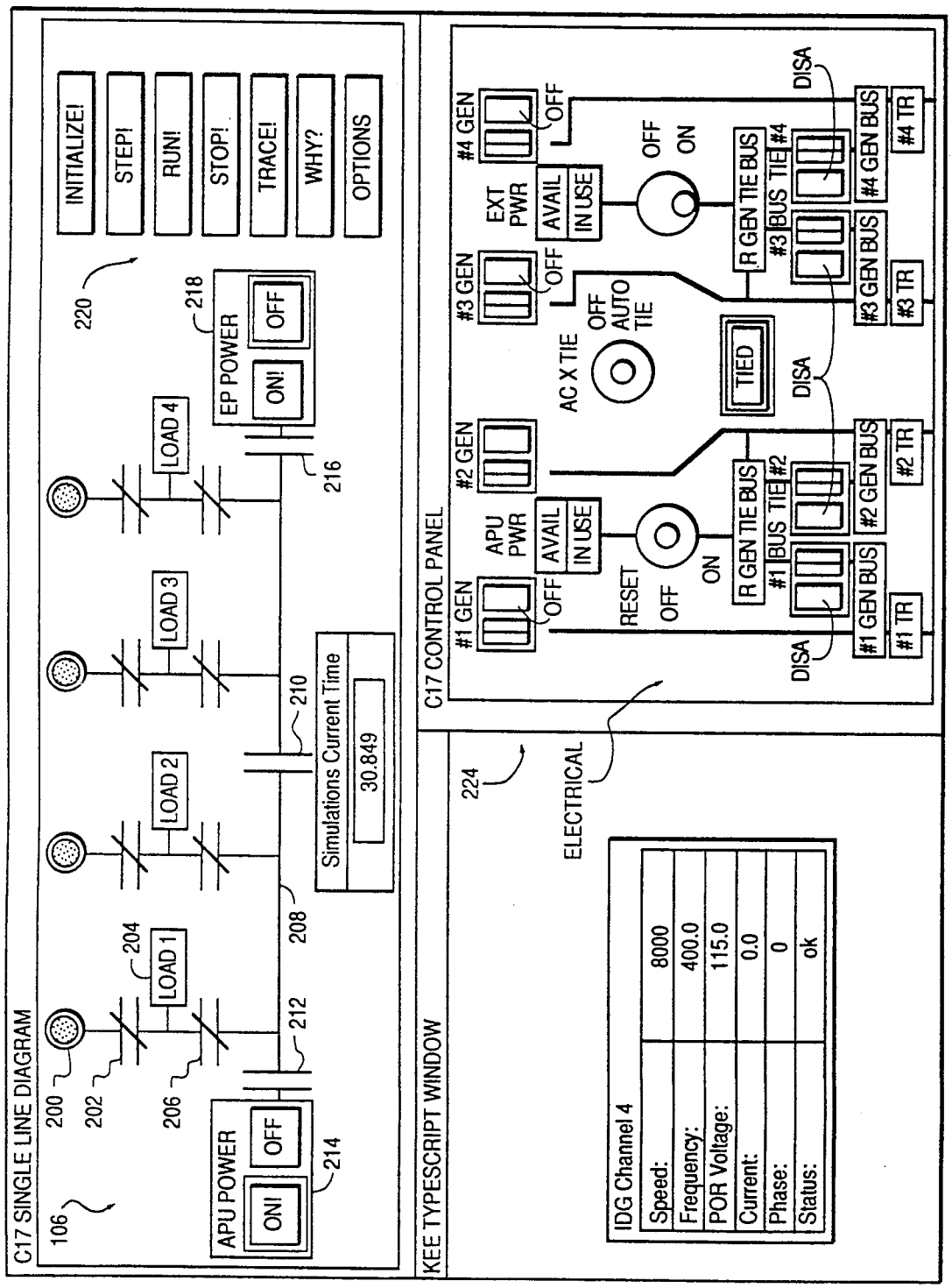
Figure 23:
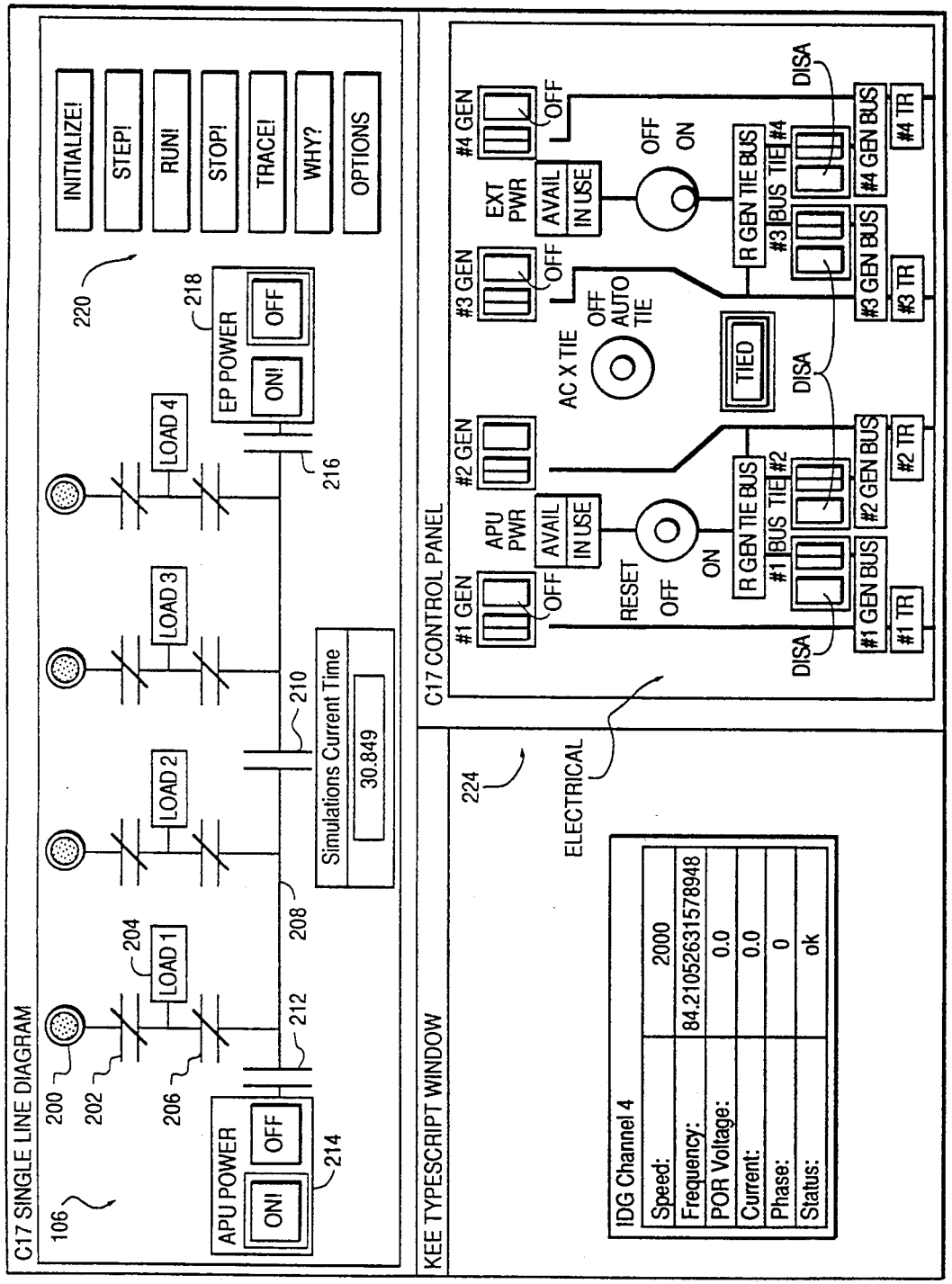
Figure 24A:
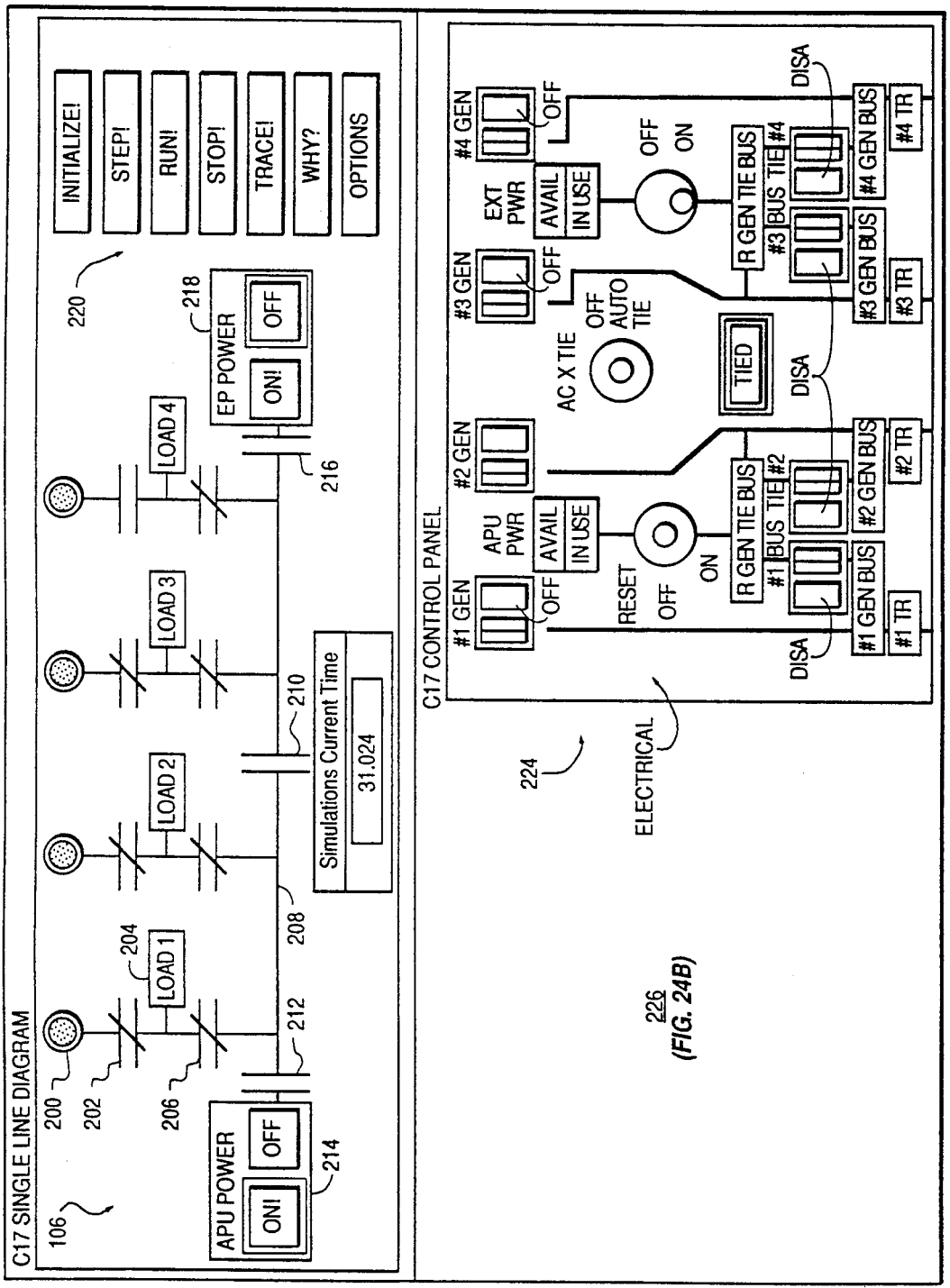

Operation of the simulator of an electrical power generating system in accordance with the present invention requires a sequence of steps. The box labeled "TRACE!" 220 is selected by the mouse driven display. Thereafter operation parameters are inputted by the input 102 which varies system operation from a default condition in which the system is operating with no generator being selected such as illustrated in FIG. 16 to a new operational condition such as illustrated in FIGS. 22 and 23 as described below in which system operational parameters are specified within the portion 226 of the display. Thereafter in response to the inputting of the changed parameters the programmed electrical power system simulator 104 causes the states of the elements such as the elements 200-218 to change state to reflect the new operational state of the simulated electrical power generating system 100 in response to the enputted change conditions such as those illustrated in portion 226 of the display in FIGS. 22 and 23.

Figure 17:
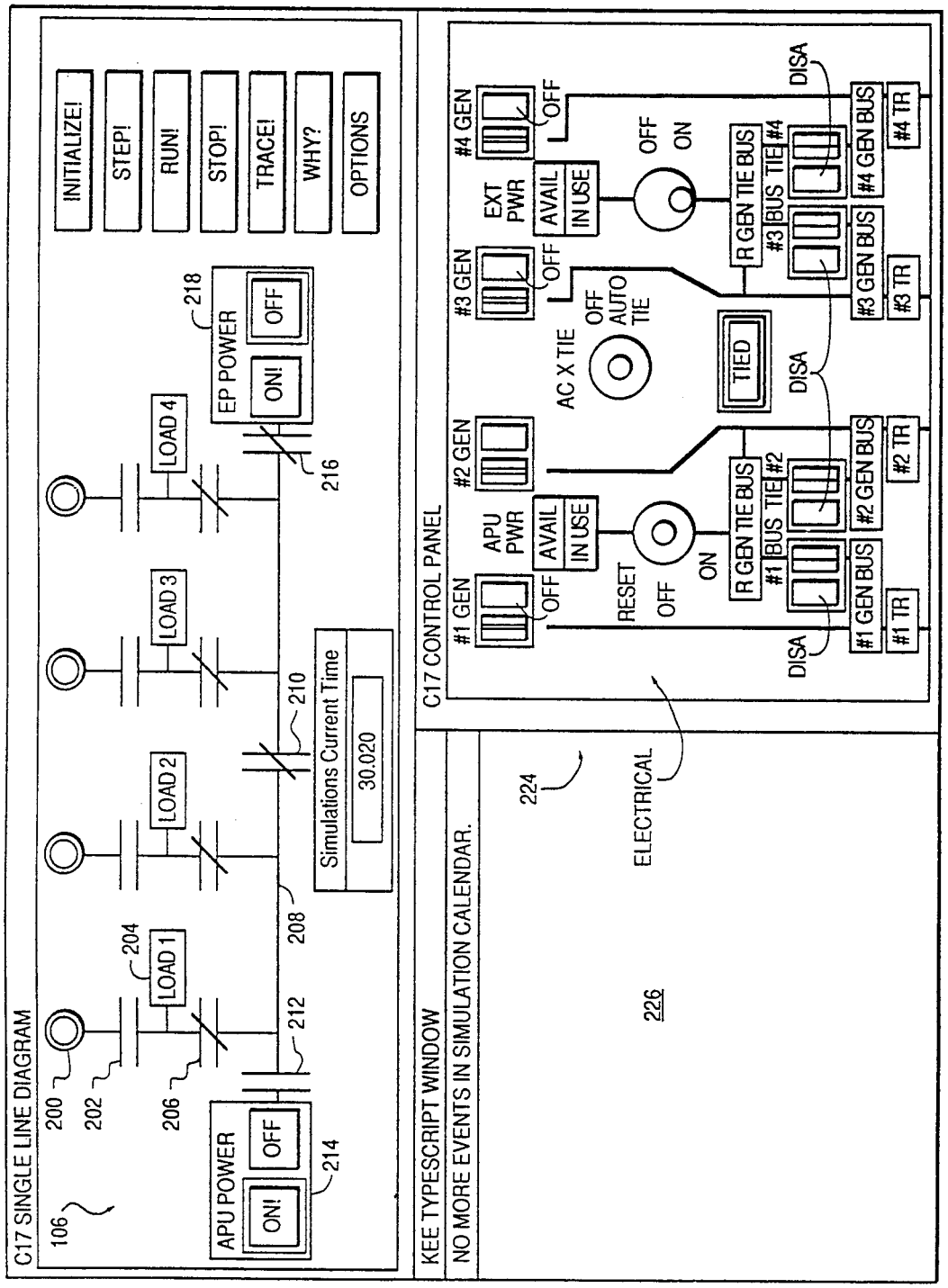

FIG. 17 illustrates the operation of the system after external power 218 has been connected to the system bus 208 by closing the contactor 216 and the split system breaker 210. It should be noted that the portion 224 of the display 16 of the cockpit instrument panel has been changed to show that the external power display button has moved down to the ON position and both "available" and "in use" indicators are shown as being activated by appearing as light areas in FIG. 17.

Figure 18:
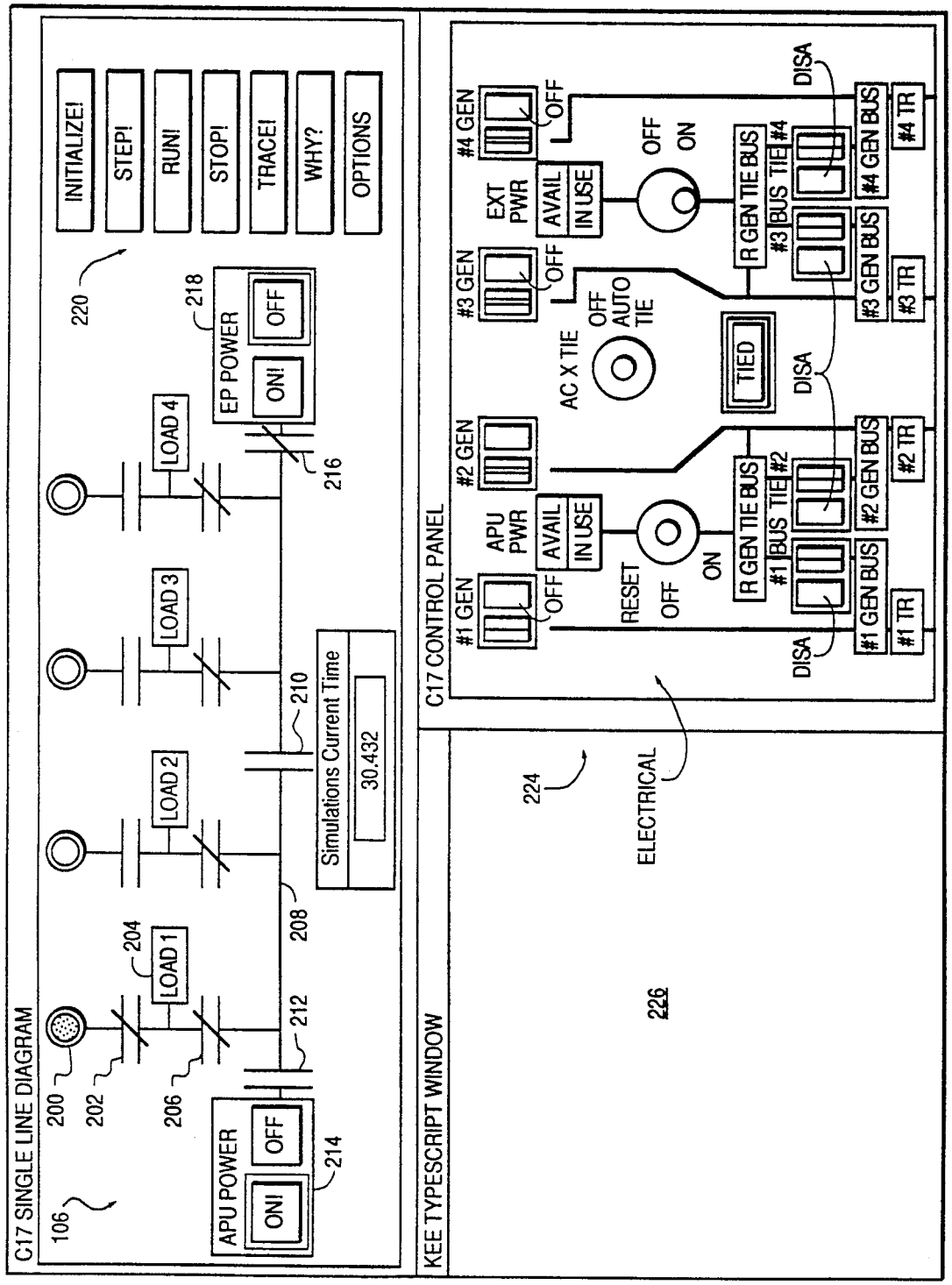

FIG. 18 illustrates a change in the state of FIG. 17 to reflect that the generator 200 of the first channel is selected and the generator control breaker 202 of the first channel has closed causing the opening of the split system breaker 210. It should be noted that the activation of the channel 1 electrical power generating element 200 is indicated by the gray coloring appearing within the circle defining the boundary of the electrical power generating element.

Figure 19A:
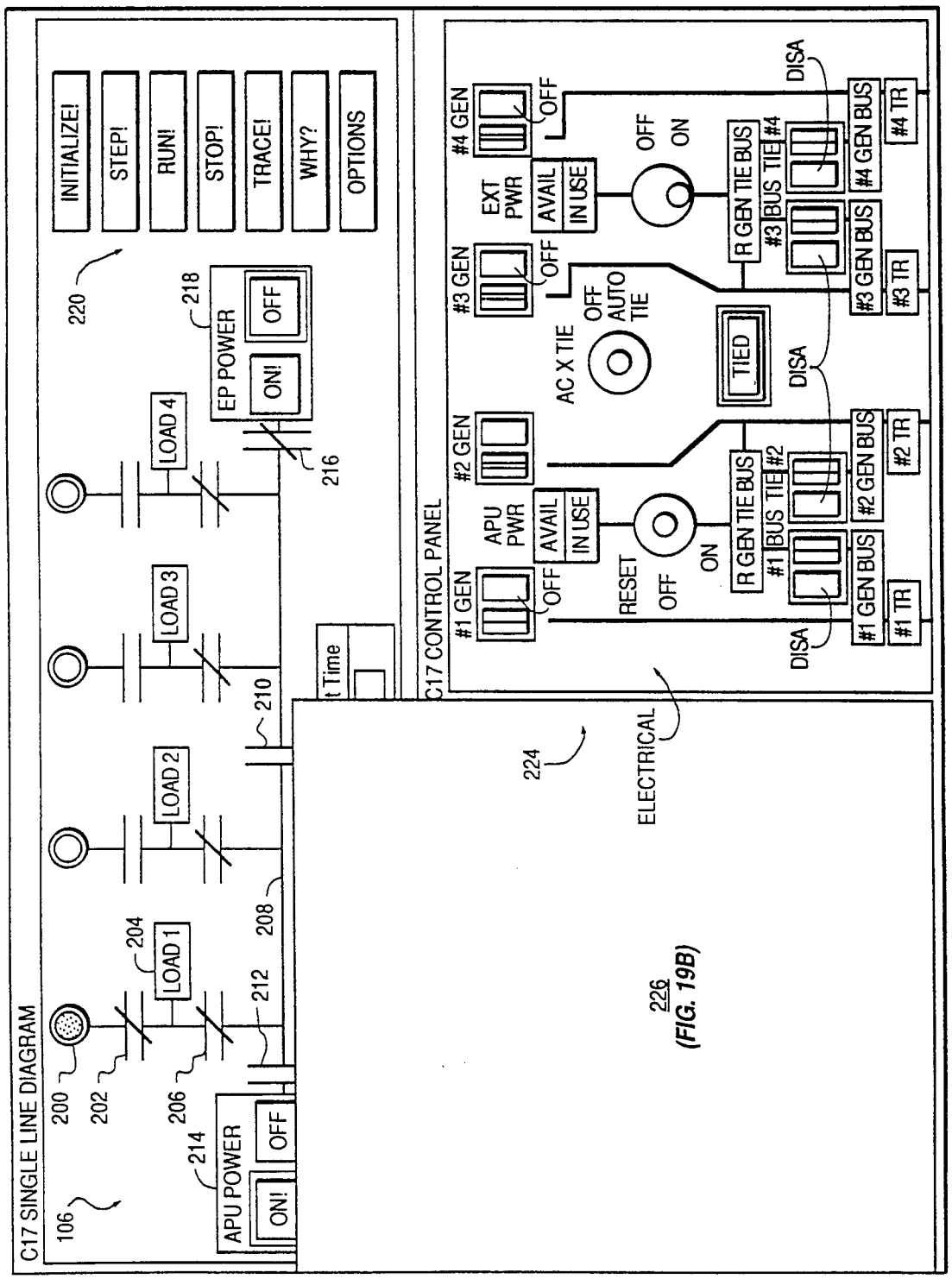

FIG. 19A illustrates the same state of the simulated electrical power generating system of FIG. 18 with the portion 226 of FIG. 19B containing the justification of why the illustrated state of the system occurred. It should be noted that the statement of reasons (justification) states the conditions which are necessary to have occurred in the simulated electrical power generating system for the illustrated state of the system contained in the upper part of the display 16. The activation of the statement of reasons is produced by moving the mouse into the traced portion of the blocks 220.

Figure 20A:
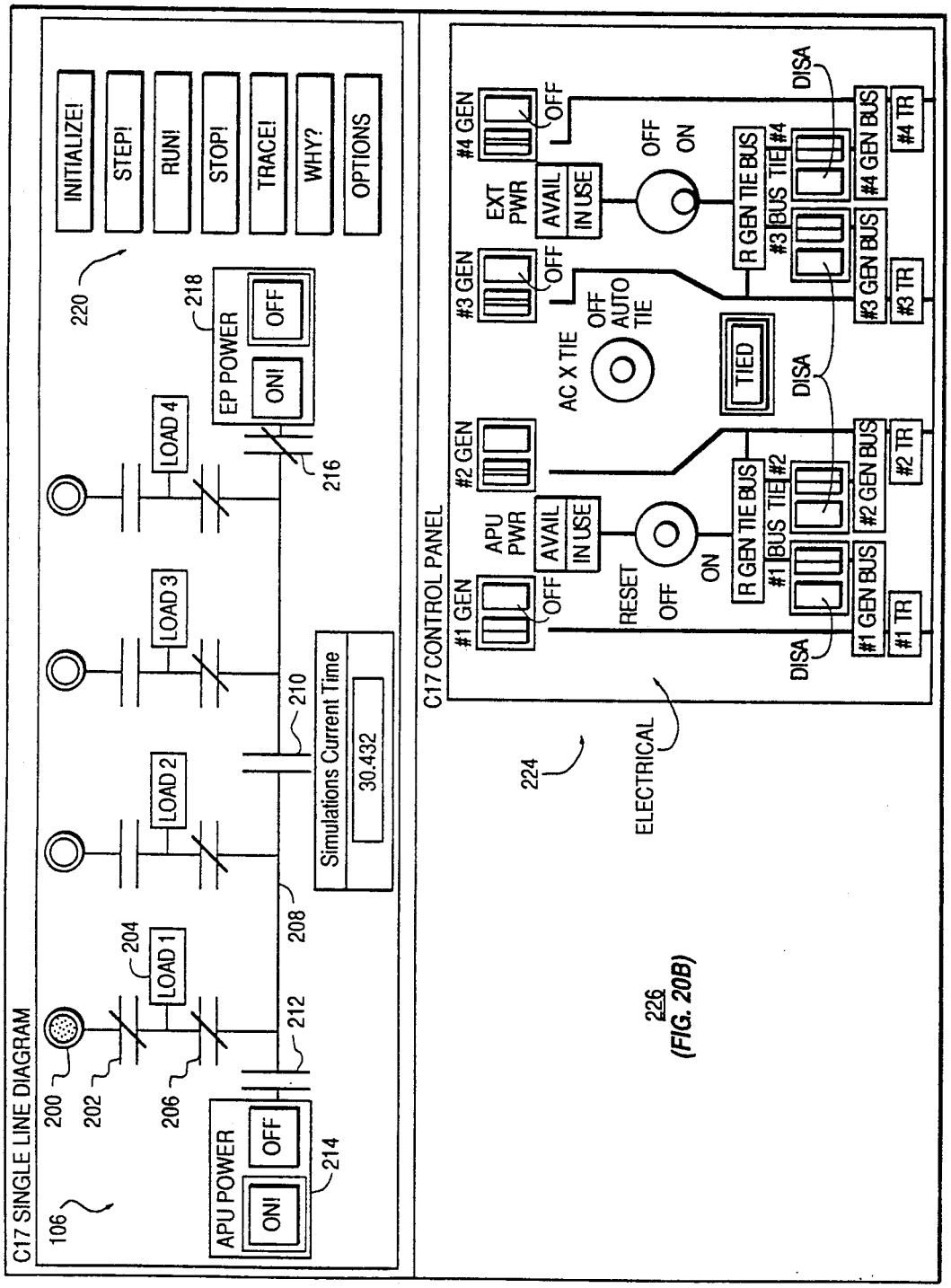

FIG. 20A illustrates the same system state as FIG. 18 with an explanation in the portion 226 in FIG. 20B of why the split system breaker 210 opened.

Figure 21A:
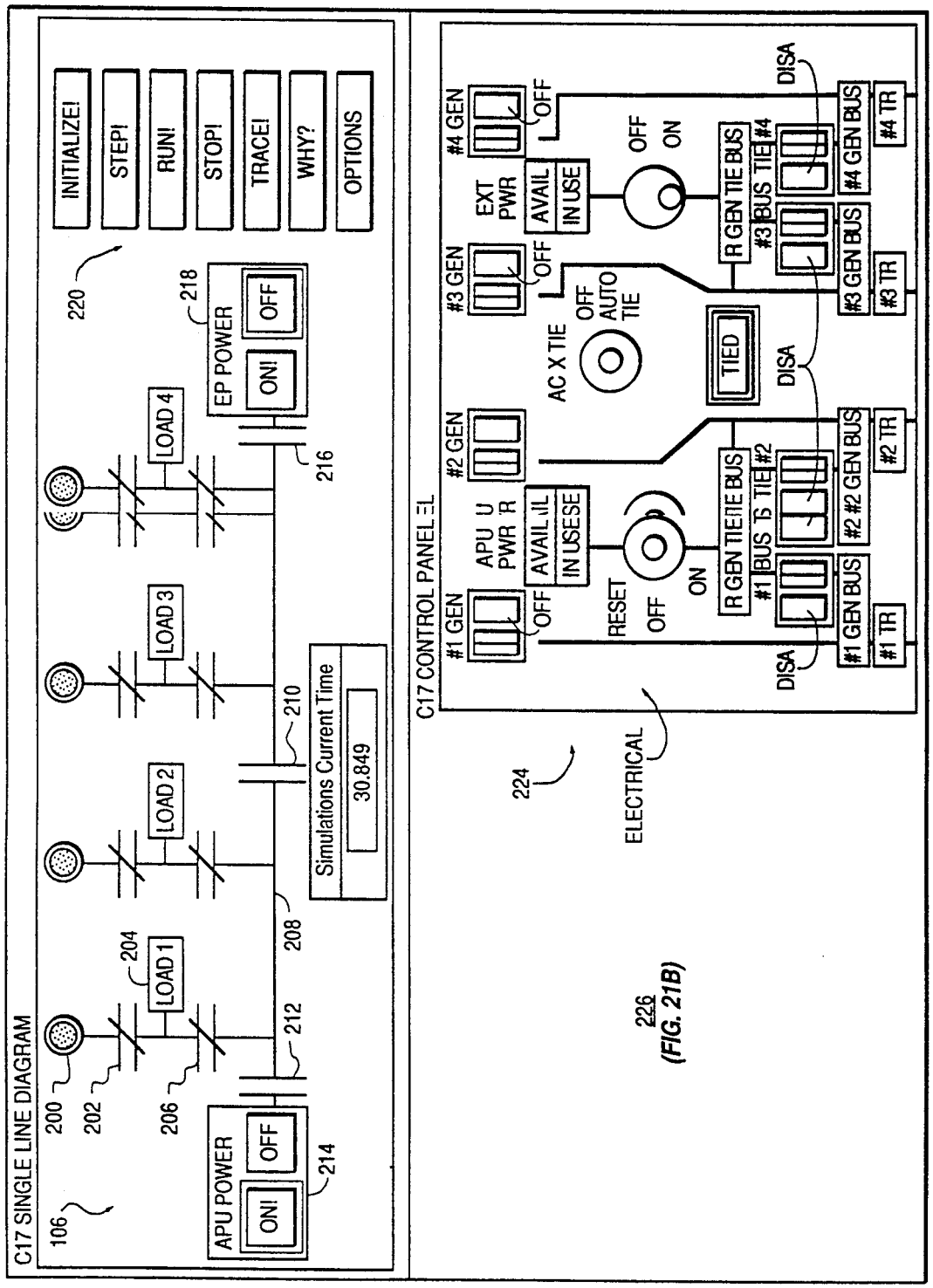

FIG. 21A illustrates the state of the simulated electrical power generating system with each of the electrical power generating elements 200 activated and an explanation of why the contactor 216 is opened appearing in FIG. 21B.

Figure 25:
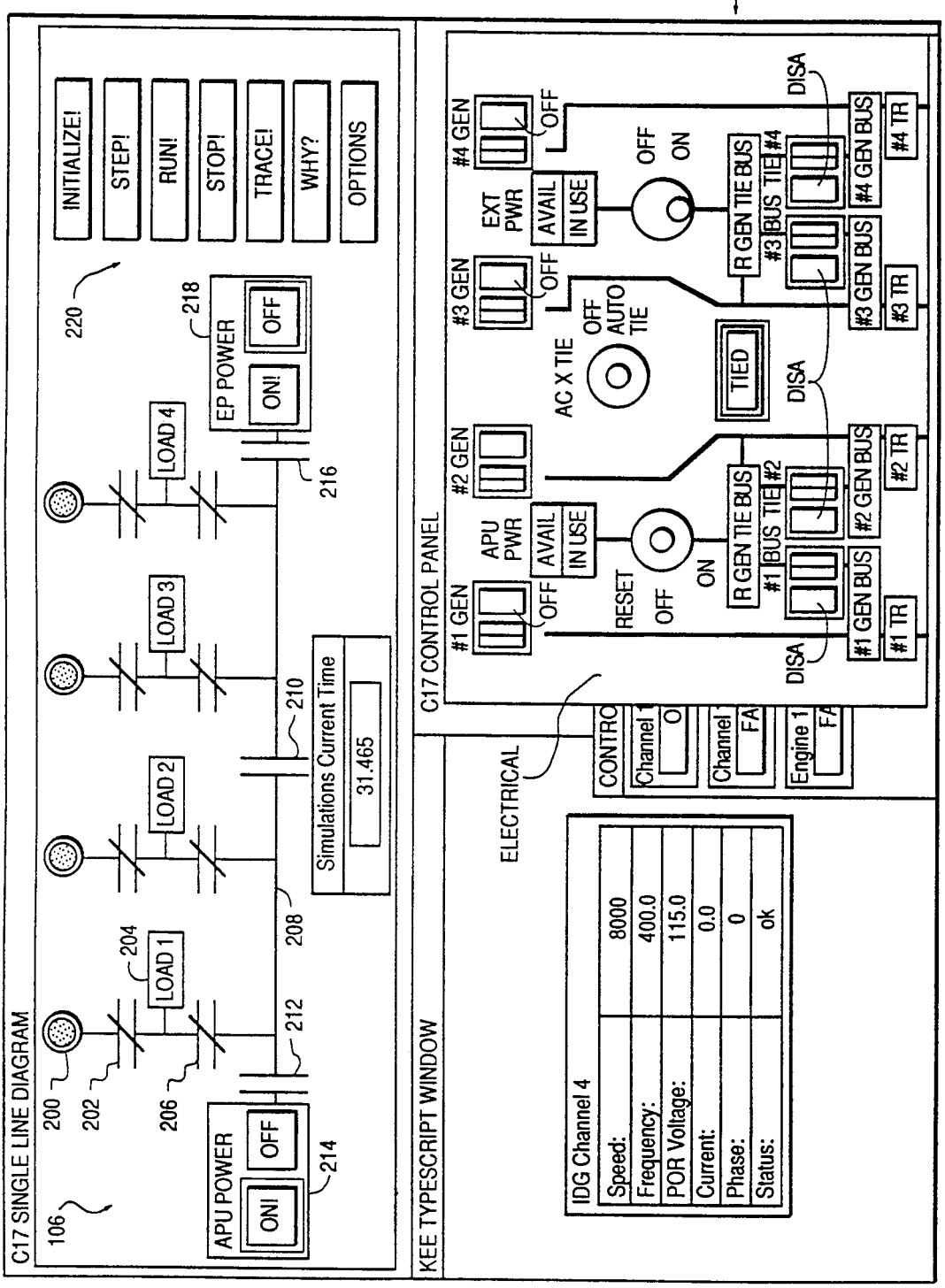

FIGS. 22-25 illustrate the state of the simulated electrical power generating system in response to an underspeed fault on the electrical power generating element 200 of channel 4 which occurs in a real electrical power generating system if a propulsion engine fails or is shut off. FIG. 22 illustrates the in portion 226 the current operating conditions of the simulated electrical power generating system including an engine speed of 8,000 rpms prior to change. FIG. 23 illustrates the change in engine speed to 2000 revolutions per minute. It should be noted that the change to a fault condition has been indicated by lightening the circular boundary of the electrical power generating element 200 of channel 4. The voltage has dropped to zero volts and the voltage regulator is disabled below 350 Hz. The generator voltage falls linearly from a maximum of 115 volts from approximately twice the rated current to zero at approximately three times the rated current and the generator frequency verses engine speed varys in two linear segments with a constant frequency jump between the segments up to a constant engine speed as a function of engine speed. FIG. 24A illustrates the state of the simulated electrical power generating system of FIG. 23. The stated reasons of why the generator control breaker 202 has opened in the fourth channel in which the fault occurred are stated in FIG. 24B. FIG. 25 illustrates the state of the simulated electrical power generating system of FIG. 22 after engine speed has been restored and the generator control breaker 202 of the fourth channel has automatically closed.

Figure 26:
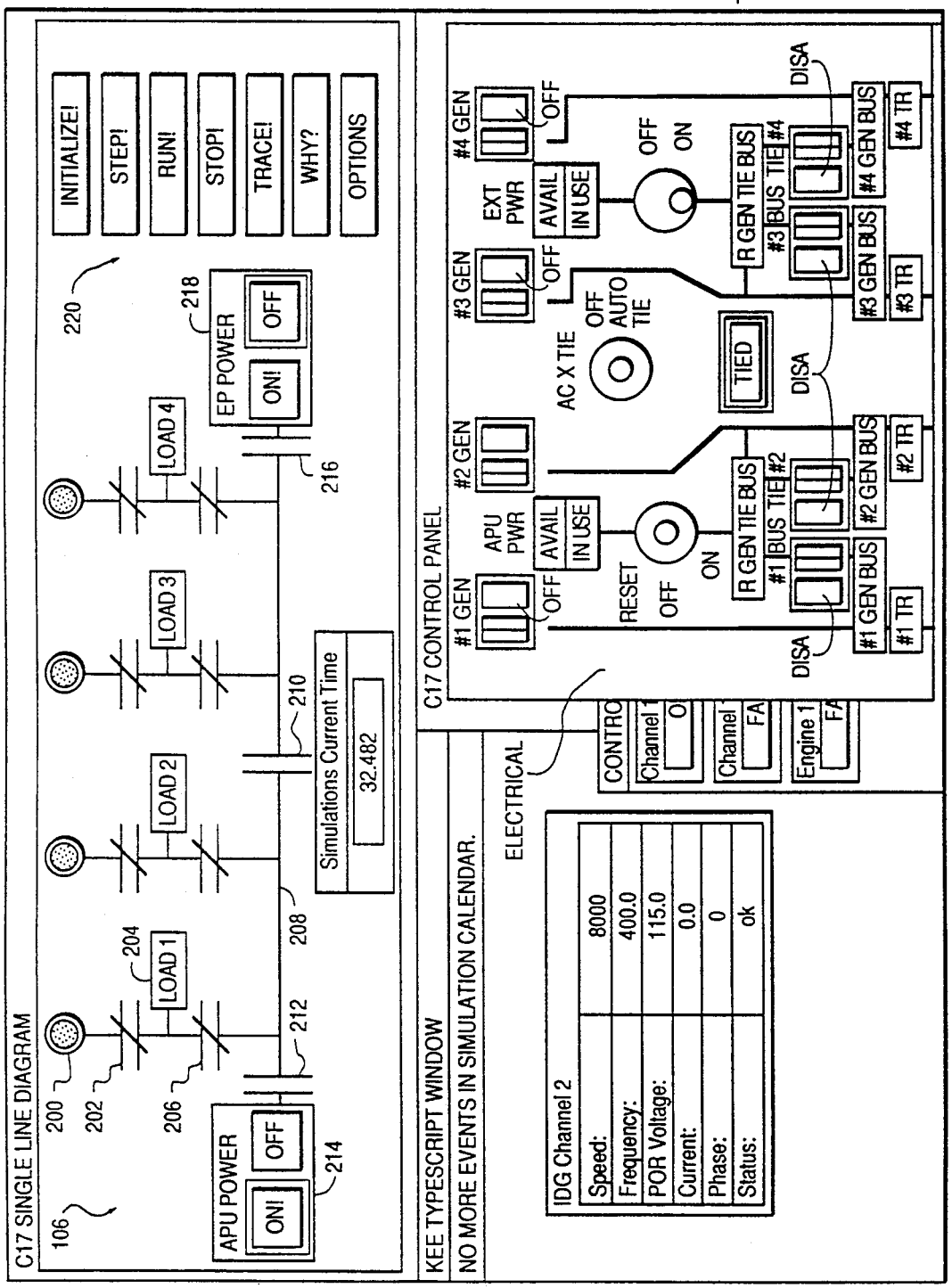
Figure 27A:
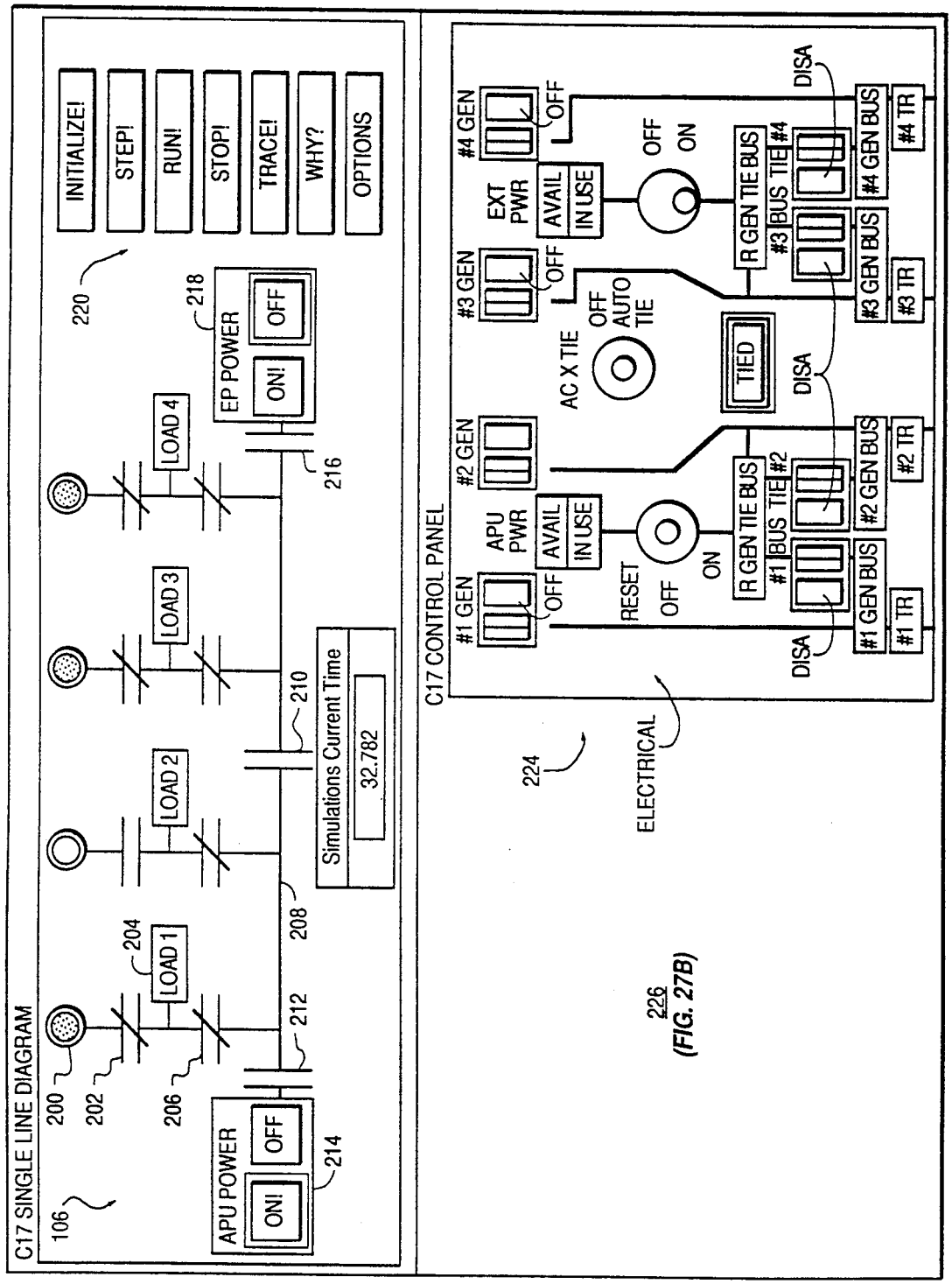

FIG. 26 illustrates the state of the simulated electrical power generating system prior to an overvoltage fault on generator 2, and FIGS. 27A and 27B illustrate the state of the simulated electrical power generating system after an overvoltage condition has occurred on the electrical power generating element in channel 2. The portion 26 in FIG. 27B of the display 16 illustrates the conditions which occurred in response to the overvoltage fault on the electrical power generating element in channel.

FIGS. 28A and B illustrate the state of the simulated electrical power generating system in response to an overfrequency fault on the electrical power generating element 200 of FIG. 3. It should be noted that the response of the simulated electrical power generating system was to trip the electrical power generating element 200 of channel 2. The fault in channel 2 is purposely not cleared when the overfrequency condition specified in the portion 226 was enputted via the input 102 to the programmed electrical power simulator 104.

FIGS. 29A and B illustrate the conditions which occurred causing the opening of the generator control breaker 202 of channel 3 of the simulated electrical power generating system.

Figure 31:
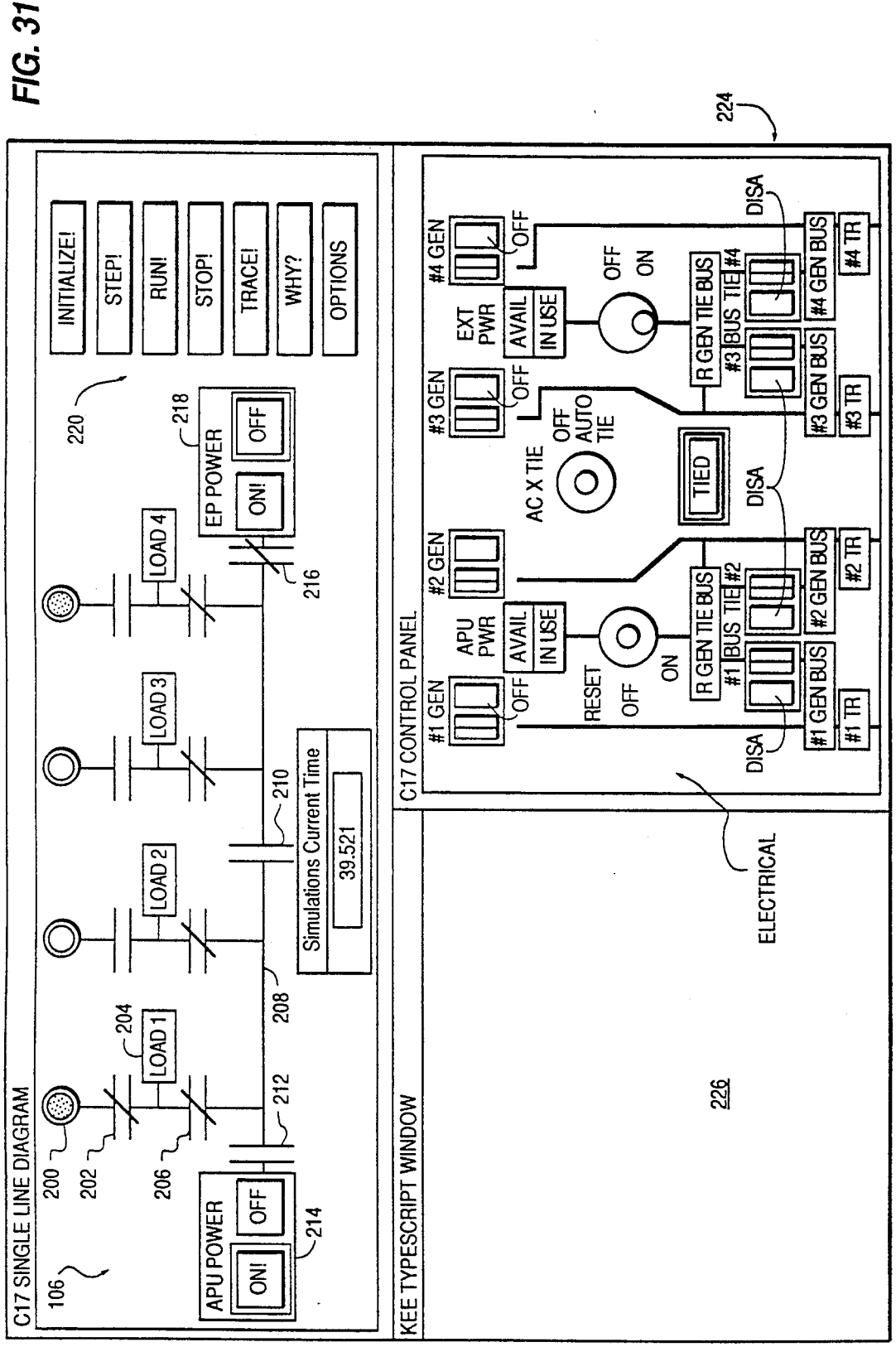
Figure 33A:
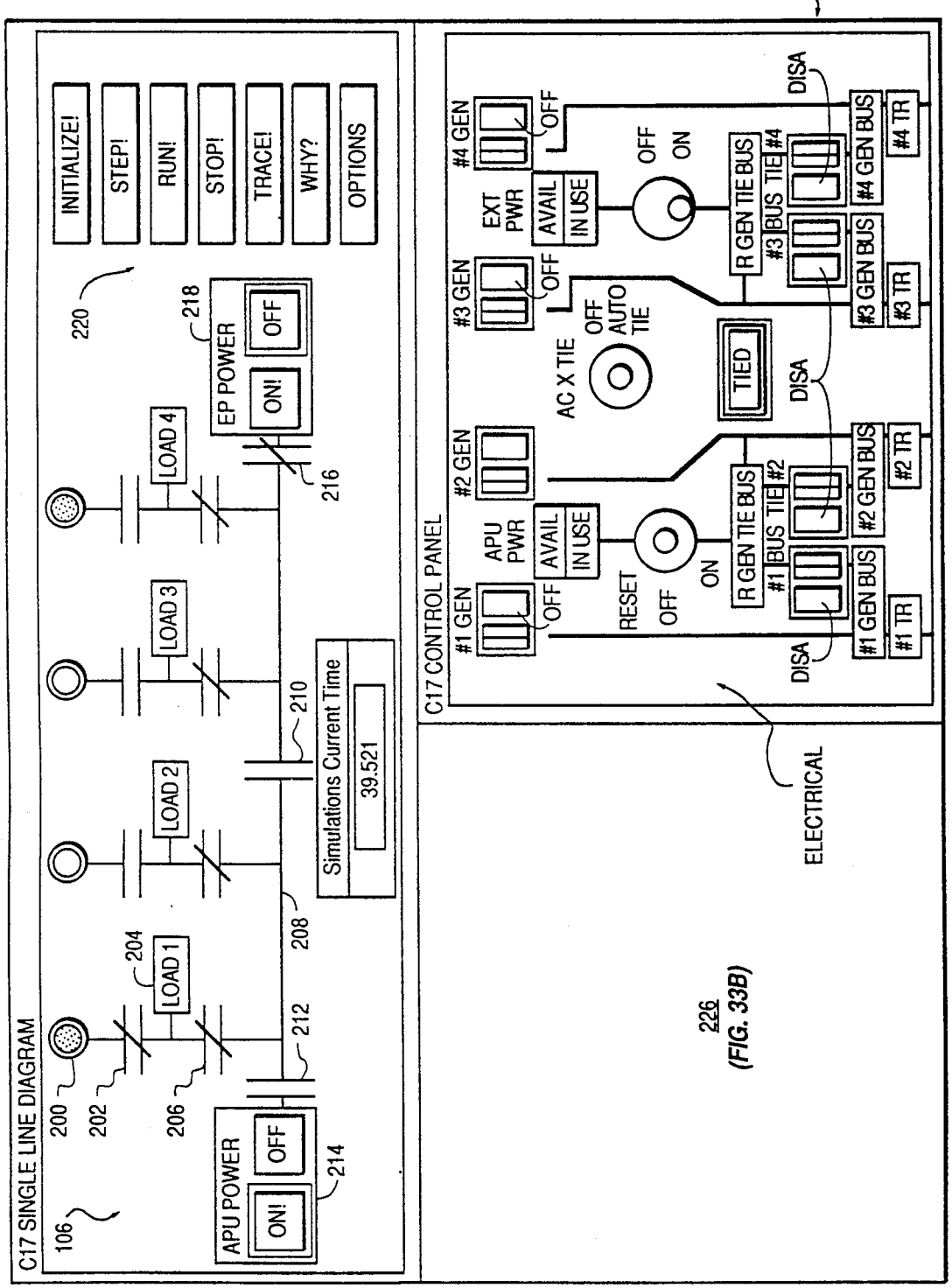

FIGS. 30-33 illustrate the state of the system in response to a sensor wire fault condition. A sensor wire fault is a condition in which a sensor of the state of one of the simulated elements of the simulated electrical power generating system such as the contactors has failed. Simulation of a sensor wire fault permits the simulation of the operation of an electrical power generating system when the state of the contactors cannot be determined correctly such as when the sensor wires give incorrect data. This permits simulated operation of an electrical power generating system without connecting four generators to external power which is a non-allowed condition for electrical power generating systems in airframes. The sensor wire fault is entered via the input 102 after the mouse is entered into the TRACE block of the blocks 220. The condition that is entered through input 102 is that the bus control unit (not illustrated) logic concludes that the generator control breaker 202 of channel 4 is open when in actuality it is closed and the logic of the remaining controllers of the system conclude that it is closed. This simulation is useful in performing Fault Modes and Effects Analysis (FMEA) to verify the level of fault tolerance in a system. FIG. 31 illustrates the state of the simulated electrical power generating system when the generator control breaker 202 of channel 4 is tripped and the contactor 216 is closed. Requirements for the simulated electrical power generating system specify that power should be maintained at all times to all loads 204 whenever possible. When the bus control unit (not illustrated) logic concludes that the generator control breaker 202 of channel 4 is open, the bus control unit concludes that power to the right side of the bus 208 is off which causes closure of the contactor 216. The generator control unit (not illustrated) logic concludes that external power 218 and the electrical power generating element 200 of channel 4 are in parallel which requires opening of the generator control breaker 202 of channel 4. FIGS. 32A and B illustrate the conclusions for opening the generator control breaker 202 of channel 4 in response to the simulated wire fault condition. FIGS. 33A and B illustrate the conclusions for closing the contactor 216 in response to the simulated wire fault condition.

Figure 34:
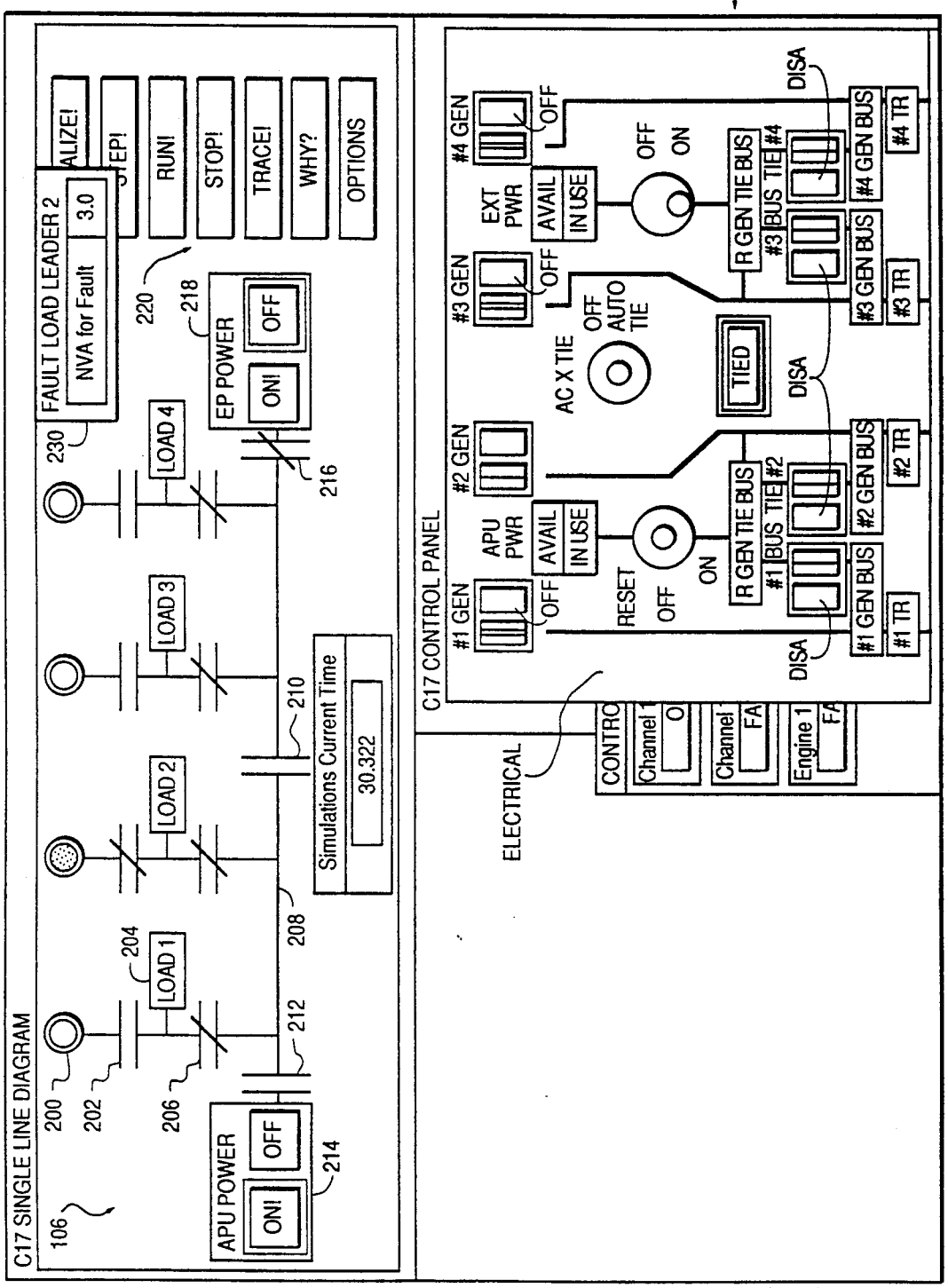
Figure 35:
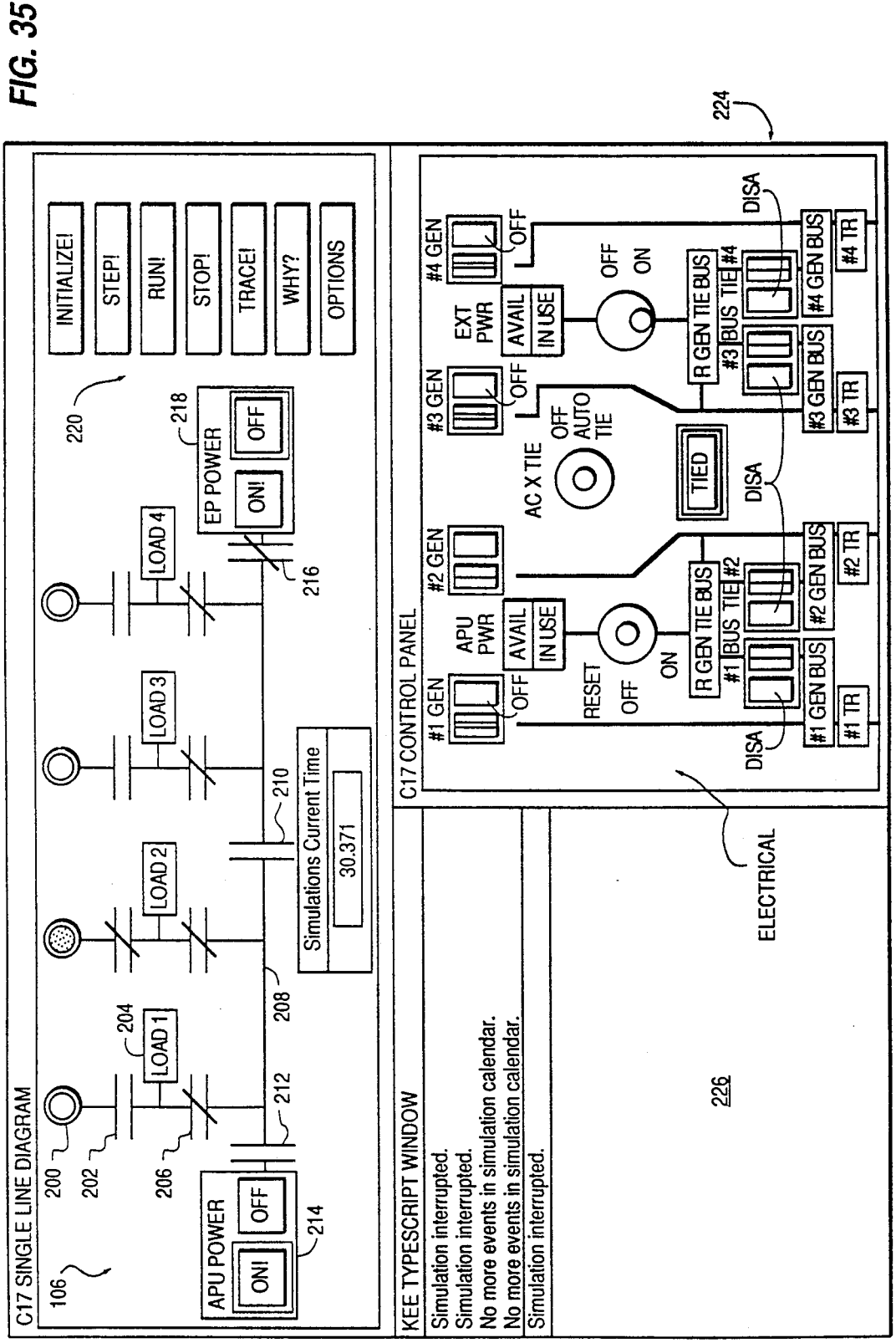
Figure 36:
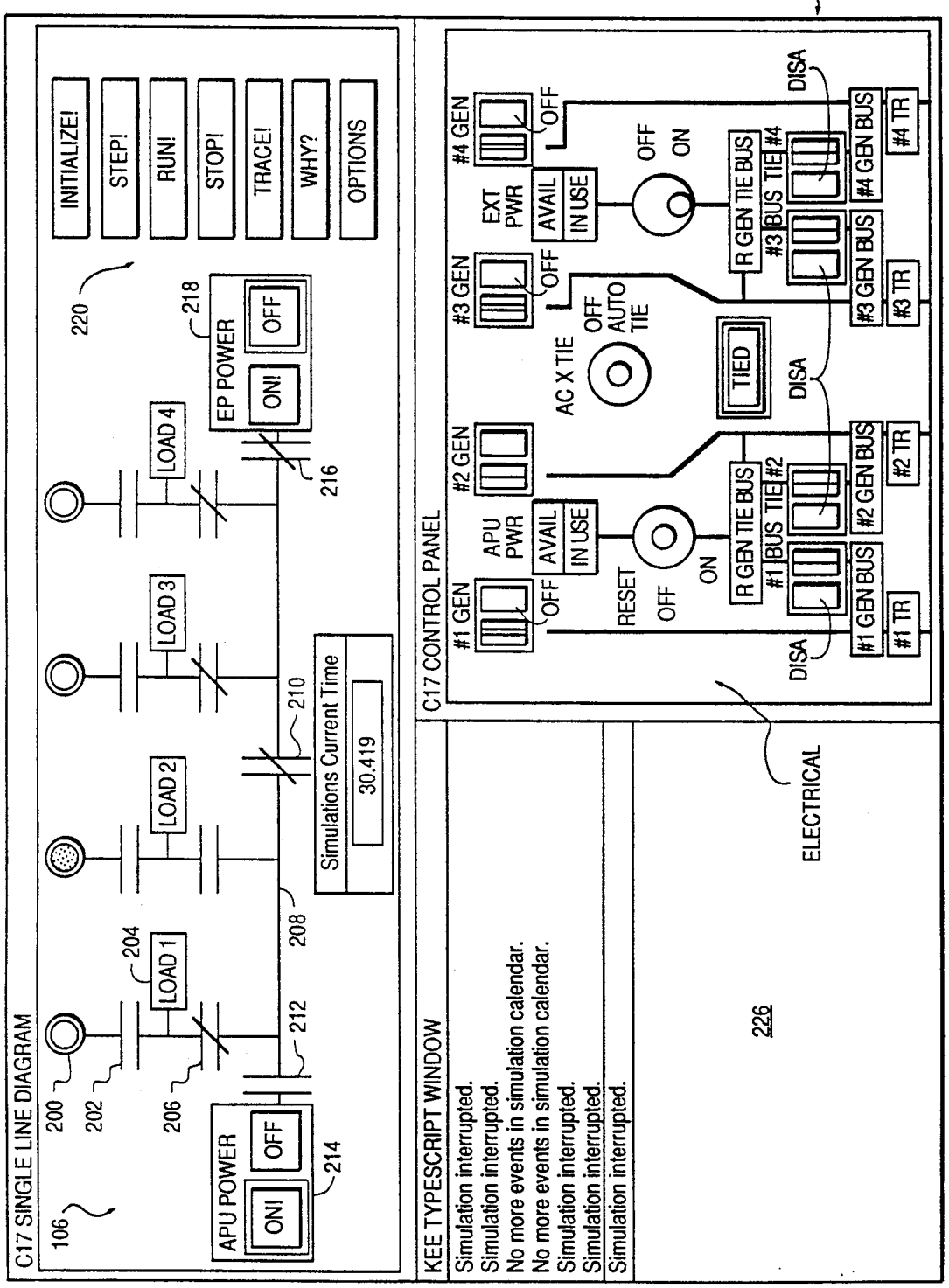

FIGS. 34-36 illustrate the state of simulated electrical power generating system in response to a differential protection fault in the second channel of an electrical power generating system of the simulated electrical power generating system. A differential fault is a fault which occurs when a difference in current flow is measured between two points in the simulated electrical power generating system. As illustrated, the simulated differential fault occurs in the bus between the electrical power generating element 200 in channel 2 and the generator control breaker 202. Current sensors in the form of current transformers are placed in a real electrical power generating system in a airframe respectively at the electrical power generating element 200 and at the generator control breaker 202 which permits the sensing of a difference in current flow through the power of the bus located between the electrical power generating element and the generator control breaker 202. FIG. 34 illustrates the state of the system in response to the inputting of the fault via the input 102. The fault is display as block 230 in the top right hand corner of the display 106. FIG. 35 illustrates the state of the system in which the bus tie breaker 206 of channel 2 has opened as a first attempt to isolate the differential fault. FIG. 36 illustrates the state of the system when the generator control breaker 202 of channel 2 is opened to continue the fault isolation sequence. It should be noted that the split system breaker 210 has closed to provide power to the load 204 of channel 1.

Figure 37:
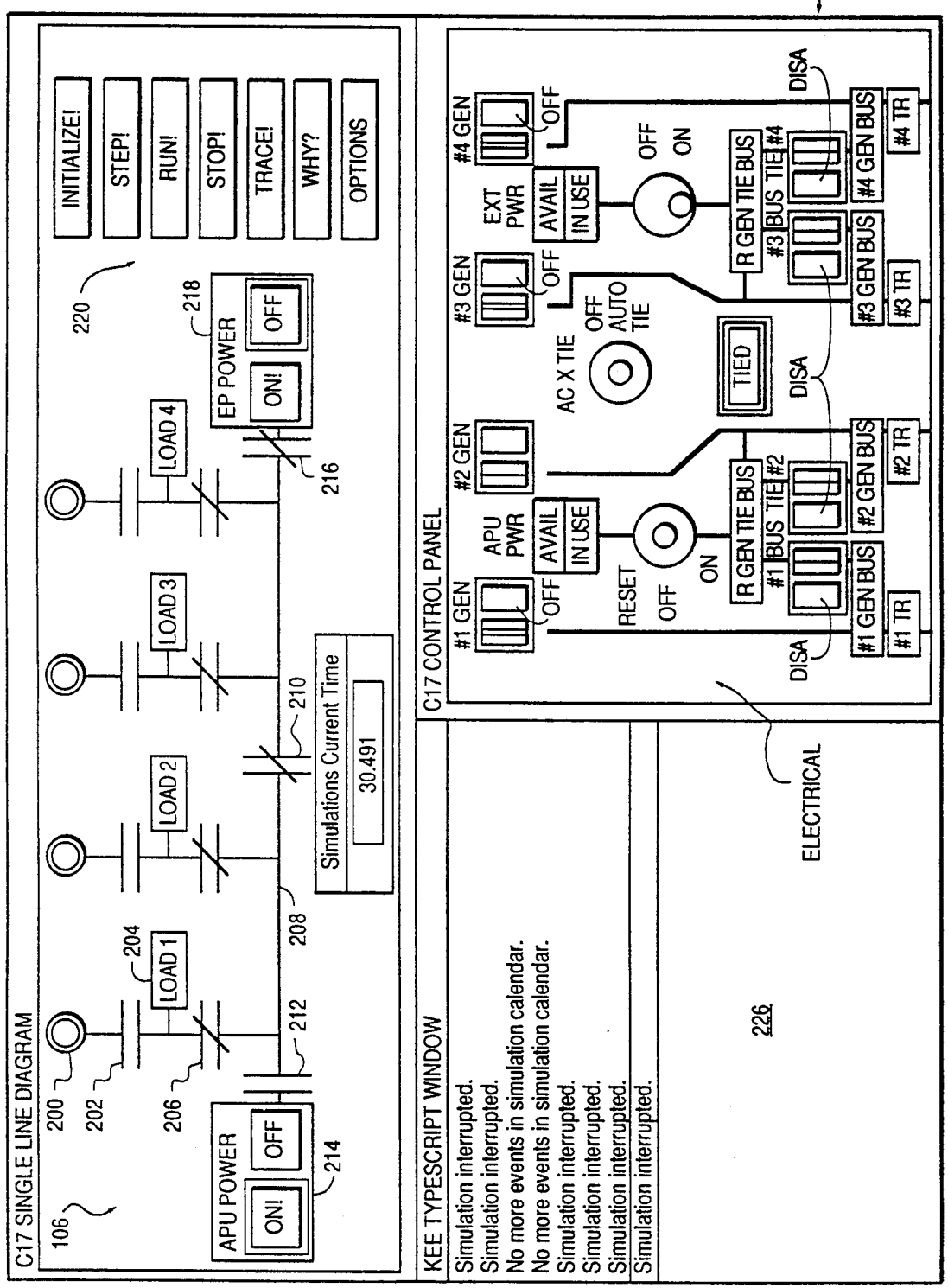

FIG. 37 illustrates the state of the simulated electrical power generating system when the loads 204 of the four channels are connected to the source of external power 218 when all four of the electrical power generating elements 200 are deactivated.

It should be noted that the illustrations of the display 106 of the simulated electrical power generating system of FIGS. 16-37 are only representative of the states of the simulated electrical power generating system which may be simulated in accordance with the present invention. The states which may be simulated are determined by the aforementioned rules and equations which are programmed into the programmed electrical power simulator 104. The displays illustrated in FIGS. 16-37 have been generated by the program set forth in the attached Appendix in response to the data inputs inputted on the input 102 and the states of the simulated electrical power generating system illustrated in FIGS. 16-37. Furthermore, it should be noted that while the preferred type of electrical power generating system which is simulated by the present invention is an airframe electrical power generating system, the present invention may nevertheless be practiced in simulating other types of electrical power generating systems.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A simulator of an airframe electrical power generating system comprising:
  a programmed electrical power system simulator specifying at least one simulated airframe electrical power generating element for generating electrical power and at least one simulated airframe contactor for connecting the at least one simulated electrical power generating element to at least one simulated airframe load bus, a state of the simulated at least one electrical power generating element, contactor and load bus of the simulated electrical power generating system during simulated generation of electrical power and stimulated state of the at least one electrical power generating element, contactor and load bus of the electric power generating system in response to a simulated fault condition;
  an input for inputting data to the programmed simulator relating to the simulated operation of the electrical power generating system; and
  an output for outputting data from the programmed simulated including a display for displaying data outputted from the programmed simulator relating to simulated operation of the electrical power generating system.

2. A simulator in accordance with claim 1 wherein:
  the state of the simulated electrical power generating system is that a plurality of simulated electrical power generating elements are connected in parallel during simulated generation of electrical power by the simulated electrical power generating system.

3. A simulator in accordance with claim 2 wherein:
  the display displays reasons why a state of a simulated electrical power generating element, contactor or load bus changed in response to a change in at least one simulated parameter of system operation of the simulated electrical power generating system.

4. A simulator in accordance with claim 1 wherein:
  the state of the simulated electrical power generating system is changed so that power from different simulated electrical power generating elements is sequentially connected to different simulated load buses.

5. A simulator in accordance with claim 4 wherein:
  the display displays reasons why a state of a simulated electrical power generating element, contactor or load bus changed in response to a change in at least one simulated parameter of system operation of the simulated electrical power generating system.

6. A simulator in accordance with claim 1 wherein:
  the state of the simulated electrical power generating system is changed to cause a break transfer to a simulated load bus between a plurality of simulated electrical power generating elements.

7. A simulator in accordance with claim 6 wherein:
  the display displays reasons why a state of a simulated electrical power generating element, contactor or load bus changed in response to a change in at least one simulated parameter of system operation of the simulated electrical power generating system.

8. A simulator in accordance with claim 1 wherein:
  the state of the simulated electrical power generating system is changed to cause a no break transfer to a simulated load bus between a plurality of simulated electrical power generating elements.

9. A simulator in accordance with claim 8 wherein:
  the display displays reasons why a state of a simulated electrical power generating element, contactor or load bus changed in response to a change in at least one simulated parameter of system operation of the simulated electrical power generating system.

10. A simulator in accordance with claim 1 wherein:
  the simulated fault condition is a maximum frequency of simulated electrical power generated by a simulated electrical power generating element of the simulated electrical power generating system.

11. A simulator in accordance with claim 10 wherein:
  the display displays reasons why a state of a simulated electrical power generating element, contactor or load bus changed in response to a change in at least one simulated parameter of system operation of the simulated electrical power generating system.

12. A simulator in accordance with claim 1 wherein:
  the simulated fault condition is a minimum frequency of simulated electrical power generated by a simulated electrical power generating element of the simulated electrical power generating system.

13. A simulator in accordance with claim 12 wherein:
  the display displays reasons why a state of a simulated electrical power generating element, contactor or load bus changed in response to a change in at least one simulated parameter of system operation of the simulated electrical power generating system.

14. A simulator in accordance with claim 1 wherein:
  the simulated fault condition is a maximum voltage generated by a simulated electrical power generating element of the simulated electrical power generating system.

15. A simulator in accordance with claim 14 wherein:
  the display displays reasons why a state of a simulated electrical power generating element, contactor or load bus changed in response to a change in at least one simulated parameter of system operation of the simulated electrical power generating system.

16. A simulator in accordance with claim 1 wherein:
  the simulated fault condition is a minimum voltage generated by a simulated electrical power generating element of the simulated electrical power generating system.

17. A simulator in accordance with claim 16 wherein:
  the display displays reasons why a state of a simulated electrical power generating element, contactor or load bus changed in response to a change in at least one simulated parameter of system operation of the simulated electrical power generating system.

18. A simulator in accordance with claim 1 wherein: the simulated fault condition is a maximum current generated by a simulated electrical power generating element of the simulated electrical power generating system.

19. A simulator in accordance with claim 18 wherein: the display displays reasons why a state of a simulated electrical power generating element, contactor or load bus changed in response to a change in at least one simulated parameter of system operation of the simulated electrical power generating system.

20. A simulator in accordance with claim 1 wherein: the simulated fault condition is a simulated sensed difference in current flow measured between two points in the simulated electrical power generating system.

21. A simulator in accordance with claim 20 wherein: the display displays reasons why a state of a simulated electrical power generating element, contactor or load bus changed in response to a change in at least one simulated parameter of system operation of the simulated electrical power generating system.

22. A simulator in accordance with claim 1 wherein: the simulated fault condition is an under excitation of a field winding of a simulated electrical power generating element of the simulated electrical power generating system.

23. A simulator in accordance with claim 22 wherein: the display displays reasons why a state of a simulated electrical power generating element, contactor or load bus changed in response to a change in at least one simulated parameter of system operation of the simulated electrical power generating system.

24. A simulator in accordance with claim 1 wherein: the simulated fault condition is an over excitation of a field winding of a simulated electrical power generating element of the simulated electrical power generating system.

25. A simulator in accordance with claim 24 wherein: the display displays reasons why a state of a simulated electrical power generating element, contactor or load bus changed in response to a change in at least one simulated parameter of system operation of the simulated electrical power generating system.

26. A simulator in accordance with claim 1 wherein: the simulated fault condition is that one simulated electrical power generating element is driving another simulated electrical power generating element which is operating as a motor in the simulated electrical power generating system.

27. A simulator in accordance with claim 26 wherein: the display displays reasons why a state of a simulated electrical power generating element, contactor or load bus changed in response to a change in at least one simulated parameter of system operation of the simulated electrical power generating system.

28. A simulator in accordance with claim 1 wherein: the display displays reasons why a state of a simulated electrical power generating element, contactor or load bus changed in response to a change in at least one parameter of simulated system operation of the simulated electrical power generating system.

29. A simulator in accordance with claim 25 wherein: the simulated electrical power generating element, contactor or load bus which changed state is displayed on the display.

30. A simulator of an airframe electrical power generating system comprising:
a programmed electrical power simulator specifying at least one simulated airframe electrical power generating element for generating electrical power and at least one simulated airframe contactor for connecting the at least one simulated electrical power generating element to at least one simulated airframe load bus, and a state of the simulated at least one electrical power generating element, contactor and load bus of the simulated electrical power generating system in response to a simulated fault condition;
an input for inputting data to the programmed simulator relating to the simulated operation of the electrical power generating system; and
an output for outputting data from the programmed simulator including a display for displaying data outputted from the programmed simulator relating to simulated operation of the electrical operation of the electrical power generating system.

31. A simulator of an airframe electrical power generating system comprising:
a programmed electrical power system simulator specifying at least one simulated airframe electrical power generating element for generating electrical power and at least one simulated contactor for connecting the at least one simulated electrical power generating element to at least one simulated airframe load bus, and a state of the simulated at least one electrical power generating element, contactor and load bus of the electrical power generating system during generation of electrical power;
an input for inputting data to the programmed simulator relating to the simulated operation of the electrical power generating system; and
an output for outputting data from the programmed simulator including a display for displaying data outputted from the programmed simulator relating to simulated operation of the electrical power generating system.

32. A simulator of an airframe electrical power generating system comprising:
a programmed electrical power system simulator specifying at least one simulated airframe electrical power generating element for generating electrical power and at least one simulated contactor for connecting the at least one simulated electrical power generating element to at least one simulated airframe load bus including rules of operation and logic equations defining the simulated at least one electrical power generating element, contactor and load bus, and a state of the simulated at least one electrical power generating element contactor and load bus of the electrical power generating system during generation of electrical power and a stimulated state of the at least one electrical power generating element, contactor and load bus of the electric power generating system in response to a simulated fault condition;
an input for inputting data to the programmed simulator relating to the simulated operation of the electrical power generating system; and
an output for outputting data from the programmed simulator including a display for displaying data outputted from the programmed simulator relating to simulated operation of the electrical power generating system.

33. A simulator of an airframe electrical power generating system comprising:
- a programmed electrical power simulator specifying at least one simulated airframe electrical power generating element for generating electrical power and at least one simulated airframe contactor for connecting the at least one simulated electrical power generating element to at least one simulated airframe load bus including rules of operation and logic equations defining the simulated at least one electrical power generating element, contactor and load bus, and a state of the simulated at least one electrical power generating element, contactor and load bus of the simulated electrical power generating system in response to a simulated fault condition;
- an input for inputting data to the programmed simulator relating to the simulated operation of the electrical power generating system; and
- an output for outputting data from the programmed simulator including a display for displaying data outputted from the programmed simulator relating to simulated operation of the electrical operation of the electrical power generating system.

34. A simulator of an airframe electrical power generating system comprising:
- a programmed electrical power system simulator specifying at least one simulated airframe electrical power generating element for generating electrical power and at least one simulated contactor for connecting the at least one simulated electrical power generating element to at least one simulated airframe load bus including rules of operation and logic equations defining the simulated at least one electrical power generating element, contactor and load bus, and a state of the simulated at least one electrical power generating element contactor and load bus of the electrical power generating system during generation of electrical power;
- an input for inputting data to the programmed simulator relating to the simulated operation of the electrical power generating system; and
- an output for outputting data from the programmed simulator including a display for displaying data outputted from the programmed simulator relating to simulated operation of the electrical power generating system.

* * * * *